United States Patent
Conner et al.

(10) Patent No.: US 6,216,149 B1
(45) Date of Patent: Apr. 10, 2001

(54) METHOD AND SYSTEM FOR EFFICIENT CONTROL OF THE EXECUTION OF ACTIONS IN AN OBJECT ORIENTED PROGRAM

(75) Inventors: Michael Haden Conner; Nurcan Coskun, both of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/175,873

(22) Filed: Dec. 30, 1993

(51) Int. Cl.$^7$ .................................................. G06F 9/00
(52) U.S. Cl. .......................................... 709/100; 709/104
(58) Field of Search .................................... 395/700, 650;
709/100, 102, 103, 104, 105, 108, 315;
717/1, 8, 10, 4; 345/346, 348, 389

(56) References Cited

U.S. PATENT DOCUMENTS

| | | |
|---|---|---|
| 4,675,829 | 6/1987 | Clemenson . |
| 4,791,550 | 12/1988 | Stevenson et al. . |
| 4,878,179 | 10/1989 | Larsen et al. . |
| 4,885,717 | 12/1989 | Beck et al. . |
| 4,930,071 | 5/1990 | Tou et al. . |
| 5,051,898 | 9/1991 | Wright et al. . |
| 5,075,848 | 12/1991 | Lai et al. . |
| 5,093,914 | 3/1992 | Coplien et al. . |
| 5,163,130 * | 11/1992 | Hullot .................................... 395/148 |
| 5,327,559 * | 7/1994 | Priven et al. ......................... 395/700 |
| 5,428,734 * | 6/1995 | Haynes et al. ........................ 395/159 |
| 5,428,792 * | 6/1995 | Conner et al. ........................ 375/700 |

OTHER PUBLICATIONS

IBM Technical Disclosure Bulletin, vol. 34, No. 9, Feb. 1992, "Link Class Hierarchy Design," R.L. Baber and C. J. Cavendish.

IBM Technical Disclosure Bulletin, vol. 34, No. 2, Jul. 1991, "Icon Pane Class," C. Cavendish and S. Ramos.

IBM Technical Disclosure Bulletin, vol. 24, No. 5, Oct. 1991, "Model View Schema," R. Baker, C. Cavendish, and S. Ramos.

IBM Technical Disclosure Bulletin, vol. 34, No. 5, Oct. 1991, "Office Container Class," R. Baker, C. Cavendish, and S. Ramos.

* cited by examiner

Primary Examiner—Majid Banankhah
(74) Attorney, Agent, or Firm—David A. Mims, Jr.; Felsman, Bradley, Vaden, Gunter & Dillon, LLP

(57) ABSTRACT

A method and system for efficiently controlling the execution of actions in an object oriented program. An observable object is defined which responds to a predetermined number of abstract events, each abstract event corresponding to an action slot container object which is associated with the observable object. New abstract events may be defined at execution and a corresponding new action slot container object associated with the observable object at that time. One or more action objects which each specify a unit of behavior are then defined and placed within the action slot container objects such that the occurrence of a corresponding abstract event may initiate the occurrence of multiple units of behavior. Separate subclasses of action objects are also defined, each subclass specifying a manner in which the specified unit of behavior will be implemented. In this manner, methods, scripts, procedures, and other abstract events may be initiated in response to an execution of an action object and a determination of the subclass to which that action object belongs.

12 Claims, 9 Drawing Sheets

METHOD AND SYSTEM FOR EFFICIENT CONTROL OF THE EXECUTION OF ACTIONS IN AN OBJECT ORIENTED PROGRAM

CROSS-REFERENCE TO RELATED APPLICATION

The present application is related to U.S. patent application Ser. No. 05/175,999, now abandoned in favor of U.S. patent application Ser. No. 08/402,408, filed Mar. 10, 1995, entitled "A Computer System for Executing Action Slots Including Multiple Action Object Classes," further identified by U.S. patent application Ser. No. 08/175,465, entitled "A System for Processing an Application Program Including Application Objects," further identified by U.S. patent application Ser. No. 08/176,000, now abandoned in favor of U.S. Patent Application Ser. No. 08/396,368, filed Feb. 25, 1995, entitled "A System for Processing Application Programs Including a Language Independent Context Management Technique," further identified by filed of even date herewith by the inventors hereof and assigned to the assignee herein, and incorporated by reference herein.

BACKGROUND OF THE INVENTION

1. Technical Field

The present invention relates to data processing systems, and more particularly to data processing systems employing object oriented programming to construct programs for execution on a data processing system.

2. Description of the Related Art

Object oriented programming systems provide means for creation and reuse of objects for the purpose of program generation, database management, graphical user interface generation and similar applications. To make most efficient use of object oriented programming, a variety of tools or utilities are required to overcome deficiencies in programming language and operating systems. More particularly, in the design and implementation of application program frameworks, there is a need to create object libraries and to extend well-known programming languages such as the C language to have object oriented capabilities. Further, applications should be designed and implemented so that they may be operating system independent and be able to be run on multiple diverse operating system platforms such as OS/2, AIX, UNIX or Windows. A reference text book which provides a description of Object Oriented Systems, including terminology and structure, is *Object-Oriented Analysis and Design with Applications,* second edition, by Grady Booch, published by Benjamin/Cummings Publishing Co., Inc. 1993. Reference to this text may be made for definition of terms related to Object-Oriented Systems.

In the prior art, there have been many articles published relating to object oriented programming and several patents which describe implementations of inventions related to object oriented programming where the patents deal primarily with database or file system management in a computer system.

U.S. Pat. No. 4,953,080 is an example of an object oriented system for file system management in a computer. The file system includes a plurality of application programs, a plurality of data files, a plurality of class data structures, and a plurality of object data structures. Each class data structure includes a reference to an application program within the plurality of application programs. Each object data structure includes a reference to a class data structure from the plurality of class data structures and a reference to at least one data file from the plurality of data files. The use of object data structures adds a layer between a user of the computer and data files. This allows for the computer to refer to an object data structure and associated access files using a tag which is inaccessible to the user. The user refers to an object based on the physical location of the object on the screen. The user may also give the object data structure a name, which is totally unconnected to the value of the tag. This allows a user to, for instance, give two objects in the same directory, the same name. Further, the file system includes a plurality of link data structures, each link data structure including a reference to a first object data structure in the plurality of object data structures which serves a parent object off the link, and including a reference to a second object data structure in the plurality of object data structures which serves as a child object of the link.

Although the patent generally describes an object management facility for a file management system in a computing system, the patent does not describe an object oriented system in accordance with the present invention in which an abstract action object class is created to allow other objects to have their behavior customized at run time under different triggering conditions for activation of the action.

U.S. Pat. No. 5,050,074 describes a system for facilitating coordination of activities by a plurality of actors with an object data base and state/action identification. The system according to the patent includes a plurality of objects each associated with a constituent, with each object including state information defining a state and constituent information containing information relating to a constituent. The system further includes tables to identify processing actions in connection with the various states of each object, state transitions for each object in connection with each action defined by the action definition table, and actors associated with each constituent. The system initially determines, in response to constituent information from an actor and the object access definition table, the association of the actor with respect to a constituent and selectively processes the object associated with the constituent as defined by the action definition table and modifies the state of the object as defined by the state transition definition table. In the system according to the present invention, the actions related to the various states of each object are kept as part of the state that belongs to that object. The action information is not stored in a global action definition table as in the prior art. This improves the overall response time of the system. The system described in U.S. Pat. No. 5,050,074 also includes a table to keep state transitions for each objects actions. In other words, the actions are limited to primitive state transitions. In the system according to the present invention, the actions can be defined through method calls, scripts, procedure calls, and action slot executions.

IBM Technical Disclosure Bulletin, Vol. 32, No. 4A, September 1989 at p. 182 includes an article entitled "Method for Direct Object Manipulation" which describes a method for implementing a protocol to facilitate and manage direct object manipulation between independently developed programs displayed on a computer terminal display. Direct object manipulation is described as the capability to select an object on the display screen and dynamically drag that object to another area on the screen and leave the object in the new location on the screen.

There are two primary forms of actions implied with direct object manipulation; the first is a direct repositioning of the object to another location on the screen, and the second is an action-object type of direct object manipulation where the object undergoing direct object manipulation is dragged over another object, the target object, initiating an action. Direct object manipulation provides a set of messages and functions to accomplish both forms of direct object manipulation and is used in the IBM OS/2 Presentation Manager program. As described above, there are two primary forms of actions implied with direct manipulations; direct repositioning, and a target object initiating an object. These are simple cases of actions and they are tailored to be used for direct manipulation. The system according to the present invention is not limited to just "a direct manipulation", it is the general purpose system that can be used to create compound objects with complex interactions. Furthermore, the action orientation described in the Technical Disclosure Bulletin article is not object oriented in the sense that the action information is kept as state variables in the source or target objects. The action information is not represented as a first class object. In the system according to the present invention, action objects are first class objects thus providing the advantages like extendibility and modularity.

U.S. Pat. No. 4,967,371 entitled "Method and Apparatus for Inference" describes a method of inference using frame based knowledge representation which enables the simultaneous realization of high accuracy and high speed in the process of inference. The method includes the steps of accompanying each slot with procedure information which indicates procedure for deriving the slot value of the slot from the other slot values, providing pointer information indicating the slots related to each other by the procedure indicated by the procedure information, accompanying each slot with sign information which indicates the validity of the slot value currently given, deriving the slot value in accordance with the procedure indicated by the procedure information when the slot value is missing and when the slot value is indicated by the accompanying sign information as invalid, changing the indication of the sign information accompanying the slots which are indicated by the pointer information as being related to the slot whose slot value is derived, and storing the derived slot value.

The patent deals with, among other things, slots in an expert system context and does not teach nor suggest the use of action slots containing multiple action objects, or the addition at run-time of additional actions slots within an observable object for controlling execution of action objects in an object oriented system for application framework or interface generation according to the present invention.

SUMMARY OF THE INVENTION

Accordingly, it is an object of the present invention to control interaction between application objects in an object oriented system executed on a data processing system wherein the object oriented programming system includes action objects of a number of different classes, one or more of which may be placed within a plurality of action slot container objects associated with an observable object. Additionally, the present invention provides a method of adding additional action slot container objects at run-time permitting the system to respond to newly defined abstract events.

The system, according to the present invention, employs compound object technology and provides an application framework for interactive elements of application programs. Application programs are constructed of highly integrated components called application objects. Each application object contains two main parts. The first is the data part and the second is the presentation part. The data part is packaged into an object that is persistent and observable. Persistent means that changes made to the state of the object (i.e. the data) are preserved from execution to execution. Observable means that changes in the state of the object are visible to other objects. Such data objects are called persistent observable data objects (POD). The presentation part of an object is called the View object and is also observable. A View object is analogous to the user interface part of a traditional application program. There may be several views of the same persistent observable data object. The end-users of application objects modify PODs through their Views. A View may be used to present information contained in several persistent observable data objects. The PODs may be grouped into an Inset. An Inset is a collection of PODs with at least one default View for these PODs. The Inset is also a type of POD and is therefore both persistent and observable.

In the system according to the present invention, object observability is achieved by the use of action slots and action objects. Each observable object may have any number of predefined and/or user defined action slots. The predefined action slots are determined at the design stage of the application object. The user defined action slots are determined by the user when the objects are embedded in each other to create compound application objects. The action slots for an observable object are each identified through a unique name. An action slot is a container object to store one or more action objects. Action objects can be added to the action slot by specifying the unique name and action object initialization information. An action slot can be executed which causes execution of each action object in the action slot.

An action object of a first class is an abstract object that has a state where the state is used to invoke the specified application programming interfaces. Thus, an action object respond to means to set its state as well as means to execute the action object. The action object of a first class is used to create specialized action objects of subclass such as a second class. This is achieved by utilizing object oriented programming. Several subclass action objects which might be created by the abstract action object (first class) are method, script, procedure and slot. These action objects of a second class implement the logic for programming interfaces defined in the action object of the first class. This type of customization is achieved by overwriting elements of the first class action object by the action objects of the second class.

Other prior art application frameworks employing object oriented programming systems employ only one type of action object which limits their ability to construct and customize compound objects.

Therefore, a computer system according to the present invention includes a processor, storage, a bus connecting the storage to the processor and a display subsystem connected to the bus wherein control of the interoperability of applications running on the system is maintained by an object oriented programming system.

The observable protocol, in accordance with the present invention, is based on the use of action slots and action objects. An action slot is a container object or a named queue of actions. Each observable object has a number of predefined and user defined action slots. The action slot names for a given observable object must be unique. The activation of an action slot causes the activation of all action objects within the action slot. An action object has the following features:

An action object is extensible in that subclasses of different types of action objects may be formed. The action object hides the implementation form of action supporting such subclasses of action objects such as method, script, procedure and slot action objects. The action object contains some action to be performed such as a method (by method name) or extension language code, etc. The action object also contains a target object on which the action is to be performed. Action objects can be saved and restored through visual programming objects. An action object can be activated individually or as part of the action slot.

An action object can also be defined to invoke a method of a target object. Such action objects are called method action objects. An action object may be defined to activate the action slot of a target object which is referred to as a slot action object. An action object may also be defined to invoke an external function written in some high level programming language. Such action objects are called procedure action objects. An action object may also be defined to interpret an extension language script. Such action objects are referred to as script action objects.

Action slots have the following features:

action slots define abstract events;

multiple actions may be specified for each action slot;

multiple action slots may be specified per application object; and the action slots of application objects are extensible.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
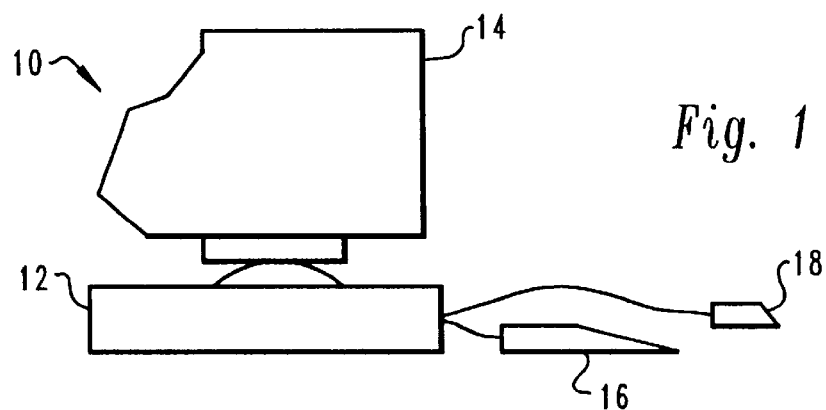
FIG. 1 is a diagram of a computer system implementing the present invention.
Figure 2:
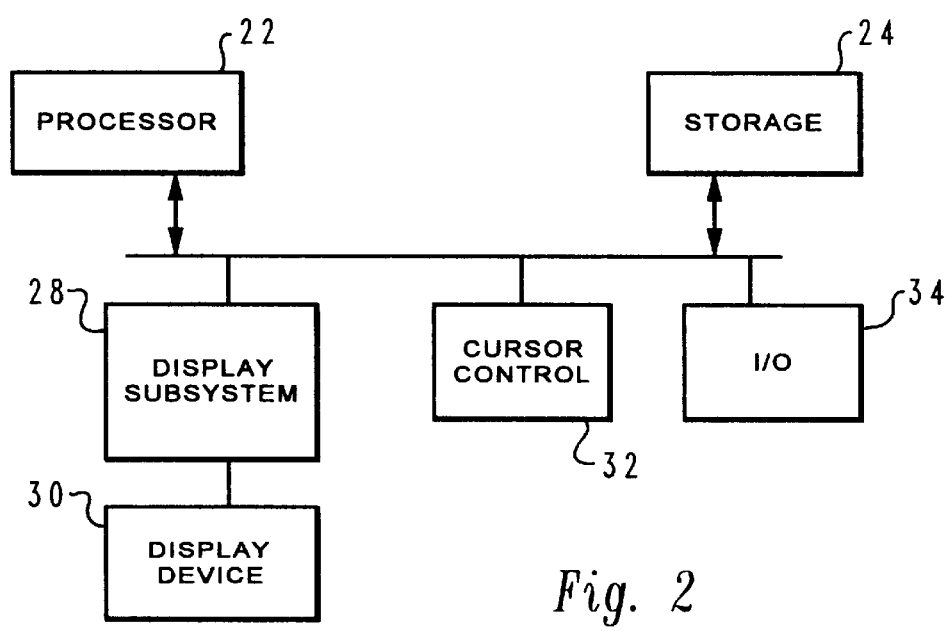
FIG. 2 is a block diagram of elements of the computer system of FIG. 1.

Referring now to FIGS. 1 and 2, a data processing system in accordance with the present invention will be generally described. Data Processing System 10 may be for example a stand-alone graphics workstation having a system unit 12, a color graphics monitor 14, a keyboard 16, and a mouse or other cursor control device 18. Modern graphics workstations are very powerful data processing systems which combine state of the art processing capability with large internal main memories coupled to peripheral storage systems such as magnetic disk drives or optical compact disks to provide the large amount of readily available storage required for graphics applications.

Data Processing System 10 includes processor 22, storage 24, bus 26, display subsystem 28 which drives a display device 30, cursor control logic 32 and input/output channel 34.

Figure 3:
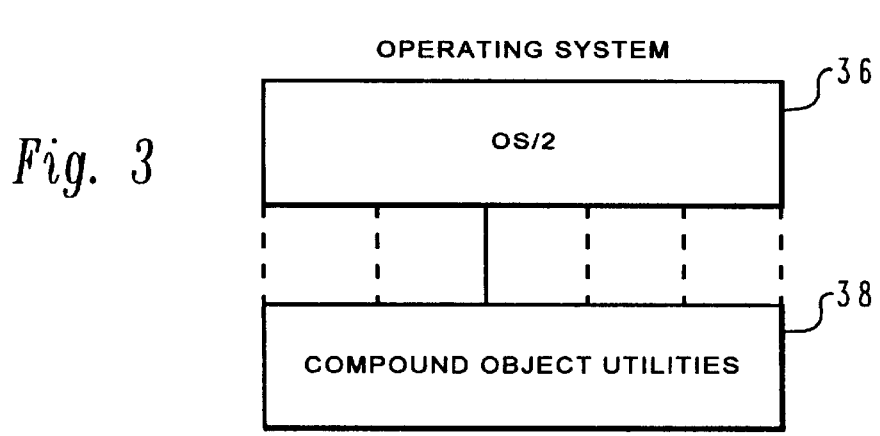
FIG. 3 is a block diagram of the system for controlling the operation of the computer system in accordance with the present invention.

Referring now to FIG. 3, the control system will be generally described.

The data processing system described above with reference to FIGS. 1 and 2 may be controlled by a commercially available and well-known multi-tasking operating system such as OS/2* (OS/2 is a registered trademark of International Business Machines Corporation). Among many other tasks which the OS/2 system controls in operating Data Processing System 10, a group of utilities referred to as compound object utilities 38 facilitate the implementation of the use of action objects and action slots in accordance with the present invention. The compound object utilities will be described with reference to FIG. 4.

Figure 4:
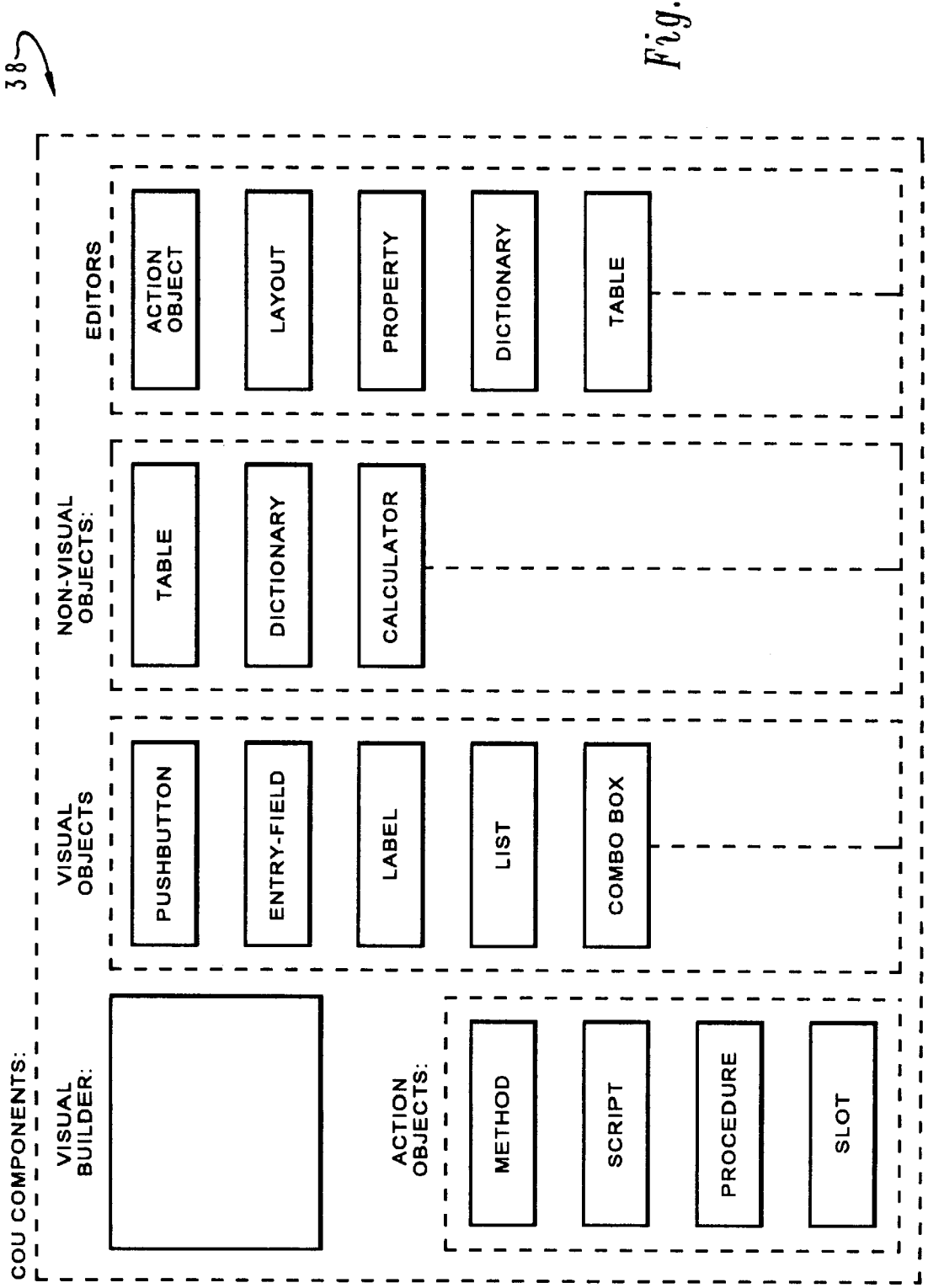
FIG. 4 is a diagram showing the components available in the compound object utilities in accordance with the present invention.

Referring to FIG. 4, it can be seen that the components of compound object utilities 38 are grouped into several major categories. Among these are a visual builder component (there are many visual builder components available for generating visual objects in object oriented programming systems currently available). Visual object components such as push button, entry field, label, list, and combination box, etc., nonvisual objects such as tables, dictionaries, calculators, etc., editors, such as action objects, layout, properties, dictionaries, and tables, etc., and subclass action objects such as method, script, script, procedure and slot.

The visual builder is used to create applications visually. Visual builder provides a tool pallet which contains visual and nonvisual objects. The user can use drag/drop operations to create and update application user interfaces visually through a layout editor. Visual builder provides editors to edit or customize different features of an application. For example, property editor is used to change the properties of the objects such as color of a label object or text of a push button object.

The property editor is used to change the properties of objects. The dictionary editor is used to populate a dictionary with integer, real, string and object values. A table editor is used to create a table of numbers. The label editor is used to layout visual objects in compound applications. The second class action object such as method, script, procedure and slot are provided to extend the behavior of visual and nonvisual objects. The action object editor is used to create action objects and add them to the visual or nonvisual objects. Visual objects are used to create the graphical user interface (GUI) for compound applications. Nonvisual objects are used to create the data objects of the compound applications.

Figure 5:
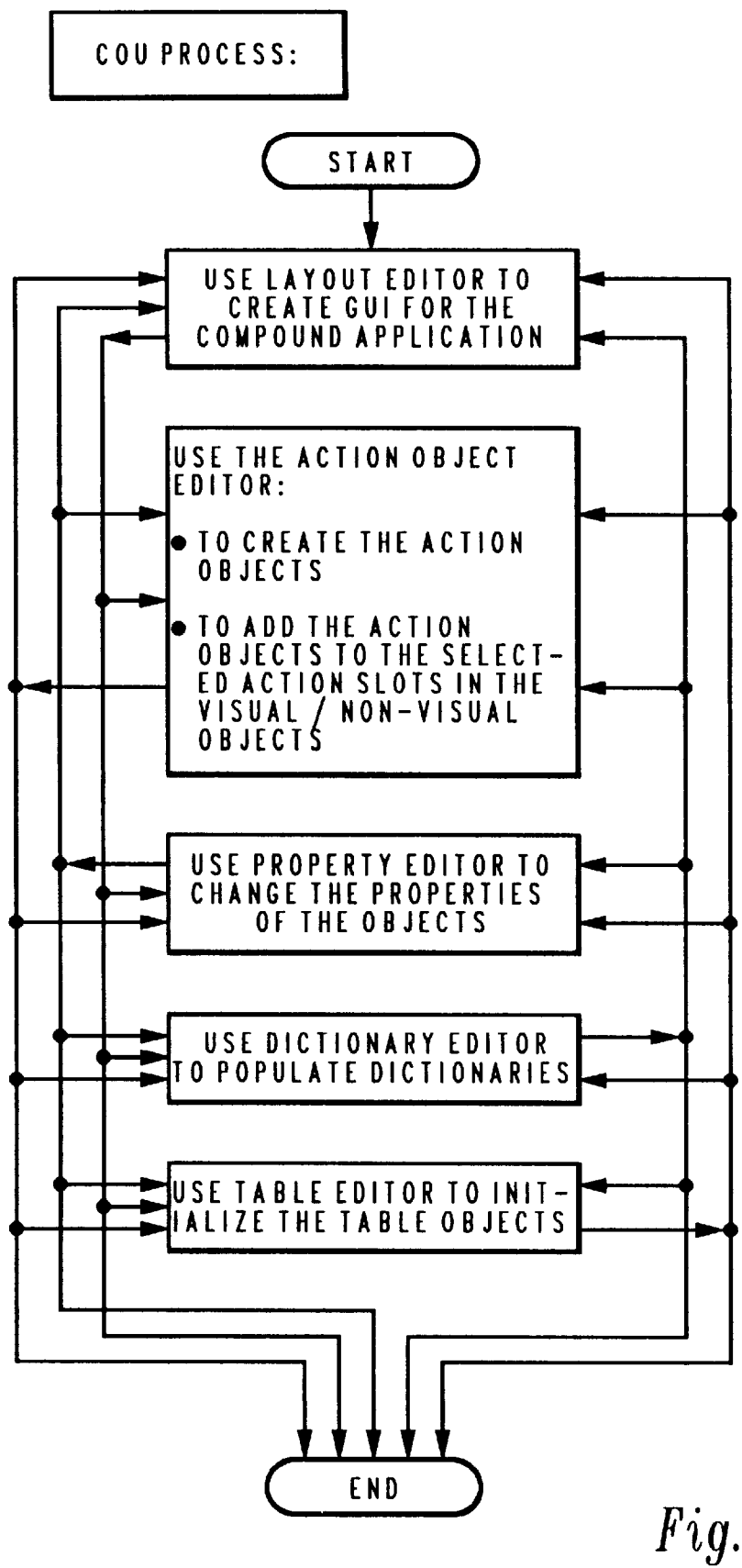
FIG. 5 is a block diagram showing the process for setting up and initializing action objects in accordance with the present invention.

Referring now to FIG. 5, the process employed by the compound object utilities will be described. When a compound application is to be created, the layout editor is used to create the graphical user interface for the compound application. Next, the action object editor is used to create action objects and to add the action objects to one or more selected action slots in the visual or nonvisual objects. The dictionary editor adds an entry to the dictionary and the table editor initializes table objects.

Figure 6:
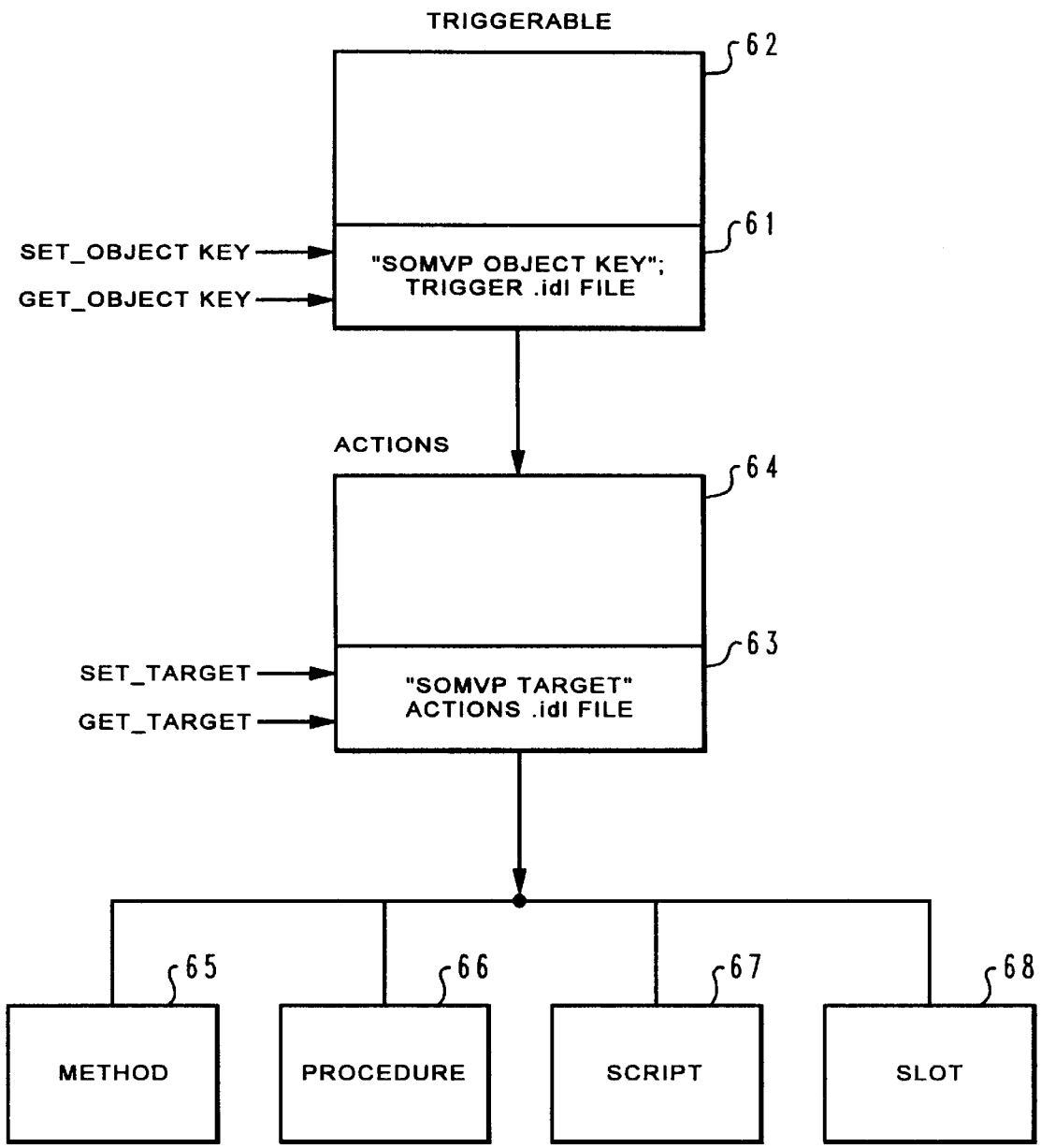
FIG. 6 is a diagram showing the structure and relationship of action objects in accordance with the present invention.
Figure 7:
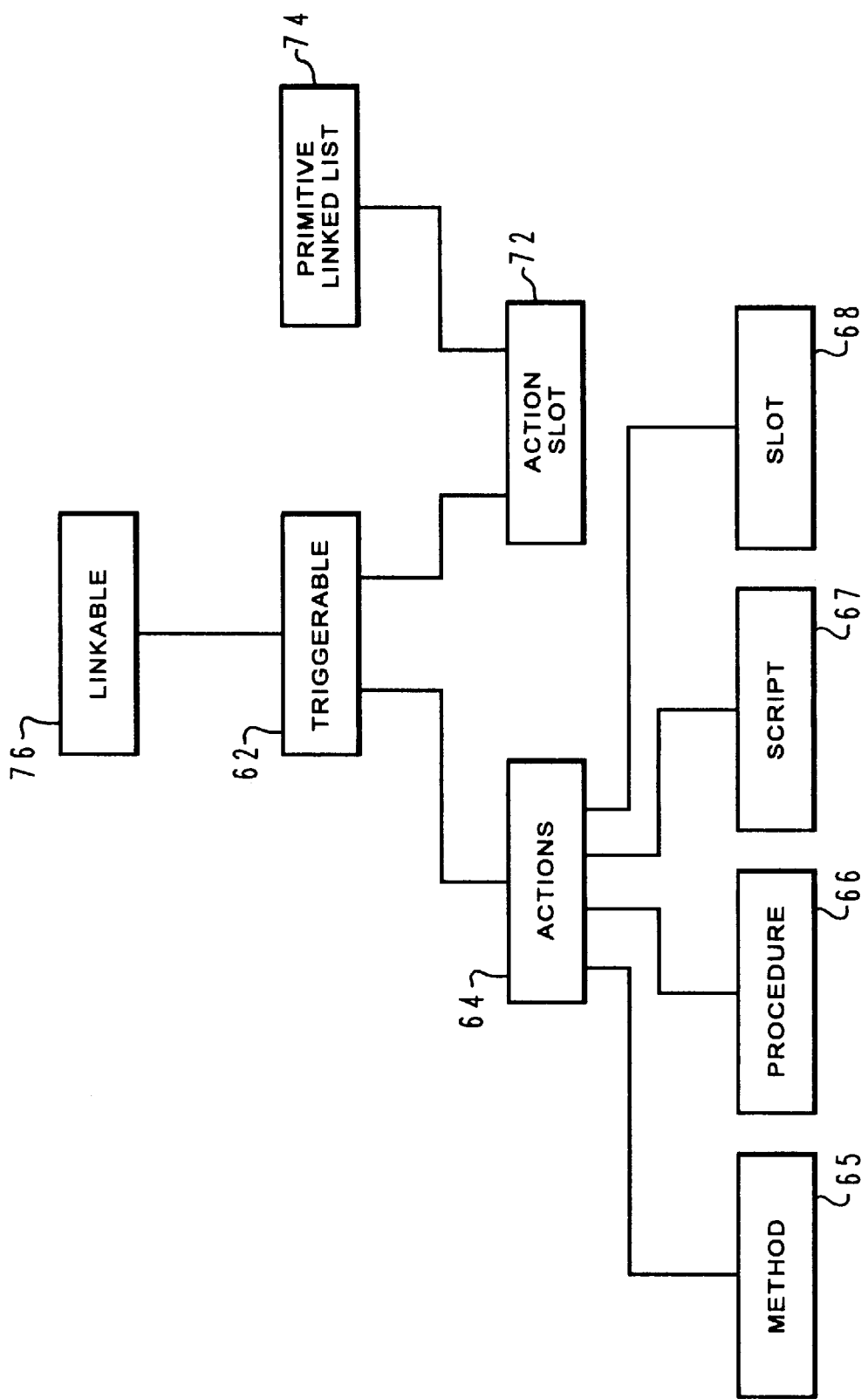
FIG. 7 is a block diagram showing the relationship of action slots, action objects and triggers.

Referring now to FIGS. 6 and 7, the structure of first class action objects and second class action objects will be described. Triggerable Object 62 has an attribute called object key 61. First class action object 64 has among other attributes an attribute called target 63. Any subclass action objects such as method action object 65, procedure action object 66, script action object 67 or slot action object 68 will have at least two attributes which can be set or accessed by using one of the following methods:

Get_object key (gets the value of the object key);
Set_object key (sets the value of the object key);
Get_target (gets the value of the target);
Set_target (sets the value of the target);

"Target" attribute holds the address of a target object. "Object Key" attribute holds the information related to the triggerable object 62. The contents of "object key" will be interpreted differently by subclass action objects 65, 66, 67 and 68, respectively. For example, method action object 65 will interpret object key 61 as the method name. Slot action object 68 will interpret object key 61 as the action slot name. Script action object 67 will interpret object key 61 as a macro which requires interpretation. Procedure action object 66 will interpret object key 61 as the name of the dynamic library and the procedure entry name in that library (not shown).

In summary, subclass action objects method 65, procedure 66, script 67, and slot 68 do not have any inherent state defined, but rather they inherit the state of the parent (higher class action objects) and can access them through "get" and "set" attribute messages.

FIG. 7 in addition to the structure described above includes an action slot 72 which may contain a number of action objects as will be described below with respect to FIG. 9 and a link to primitive link list 74 which is a prior art nonobject oriented programming technique for controlling execution of a sequence of commands or accessing data in a predetermined sequence.

Figure 8:
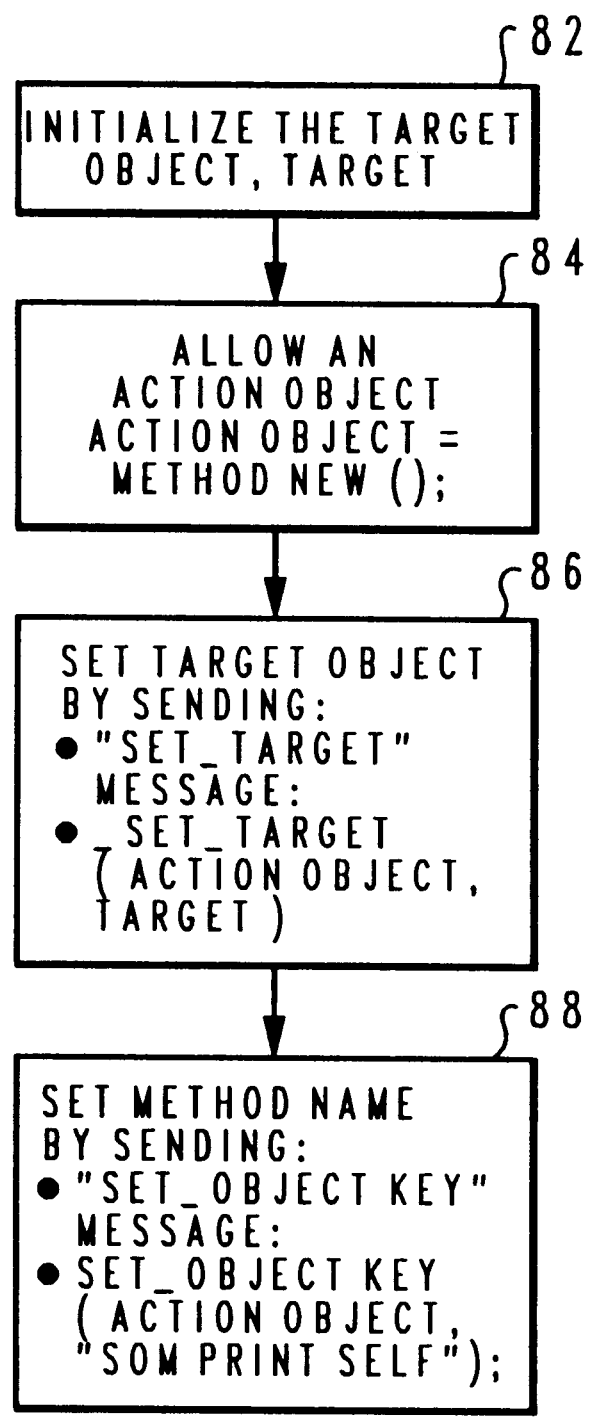
FIG. 8 is a flow diagram describing the creation of an action object of a second class in accordance with the present invention.

Referring now to FIG. 8, the creation of a subclass action object will be described using the method action object as an example. It should be noted that other subclass action objects such as slot, procedure, and script can be created in the same way. These subclass action objects inherit the behavior from the parent objects such as the abstract action object of the first class or the triggerable object as described above with reference to FIG. 6 and 7. The behavior is customized by overwriting "trigger", "action kind", and "get string form" methods. The implementation of these methods are different for different action objects. For example, "trigger" method for a method action object sends a message to the target object. "Trigger" method for a slot action object triggers an action slot on the target object, etc.

A method action object is created by the following process. The target object is initialized as shown in the initialize target object step at block 82. An action object is then allocated by the message:

action object equals method new (); as illustrated by block 84.

The target object is then set as illustrated at block 86 by sending set target message:

set_target (action object, target);.

And lastly, the method name is set by sending set object key message:

set_object key (action object, "print self"); as illustrated in block 88.

In the subclass action object such as method action object 65 (see FIG. 6), the implementation of abstract methods like "trigger" accesses the state variables through the "get" and "set" methods.

The interface definition files (idl) which follow (within Appendix A), provide additional detail on the implementation of an object oriented system for constructing and executing programs to run on a data processing system in accordance with the method and system of the present invention.

Figure 9:
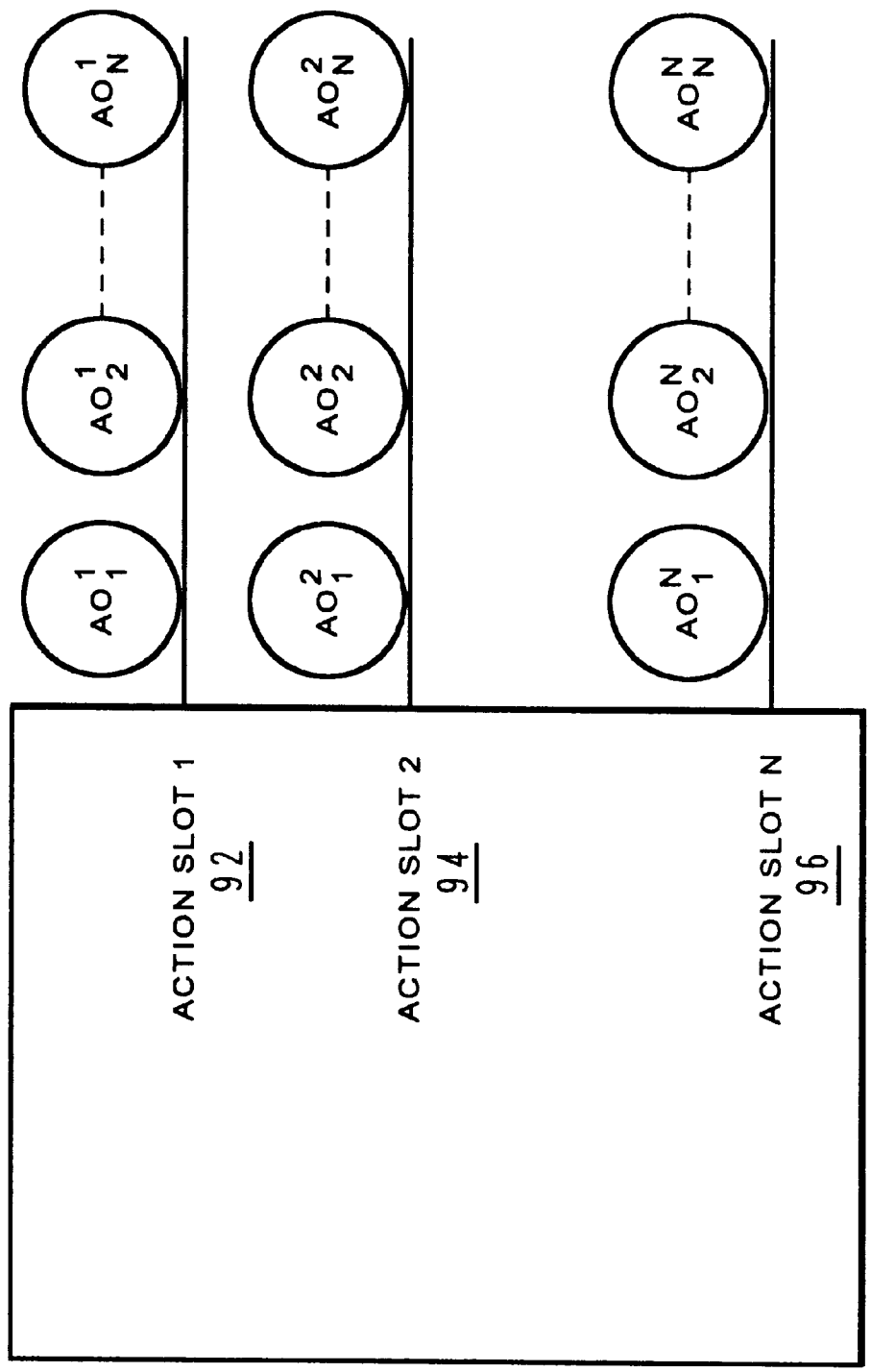
FIG. 9 is a diagram showing the relationship between action slots and action objects in accordance with the present invention.

Referring now to FIG. 9, the relationship between action objects and action slots will be further described. A number of action slots such as action slot 1 92, action slot 2 94, and action slot n 96 each having a unique name are included in the system. Each action slot has one or more action objects such as A01,1; A0,2; . . . A01, n for action slot 1 92. Action slot A02,1; A02,2; . . . A02,n for action slot 2 94. Action slot n 96 may include action objects A0n,1; A0n,2; . . . A0n,n. Since each action slot is identified by a unique name, the name of the action slot can be used to perform a search of the action slot on a source object. If a trigger object is employed to trigger an action slot on a source object, and the action slot with the unique name identifier is found, all action objects in the action slot will be executed to complete the desired operation.

In accordance with an important feature of the present invention, an observable object having a fixed number of action slots may be modified by the user at run-time to incorporate additional action slots, greatly enhancing the efficiency of the system. Thus, a "push button" observable object having two action slots: "Pressed" and "Released," may be modified to include a third action slot such as "Rotated." This new action slot may be populated with one or more action objects which will permit the "push button" observable object to respond to an abstract event which was not contemplated at the time of the object's initial design.

Figure 10:
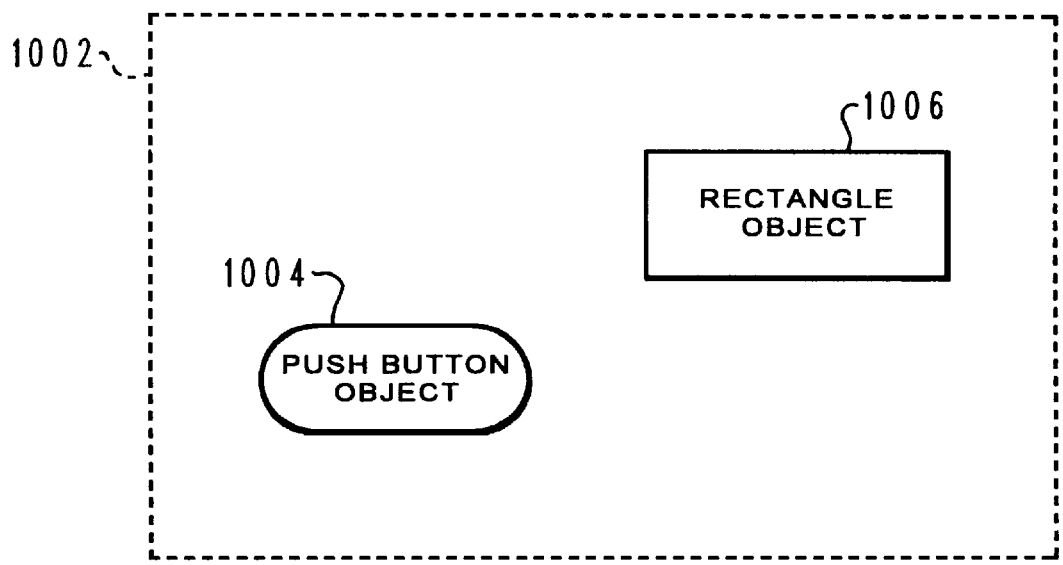
FIG. 10 is a schematic diagram of an action object and a target object on which an action is to be taken in accordance with the present invention.
Figure 11:
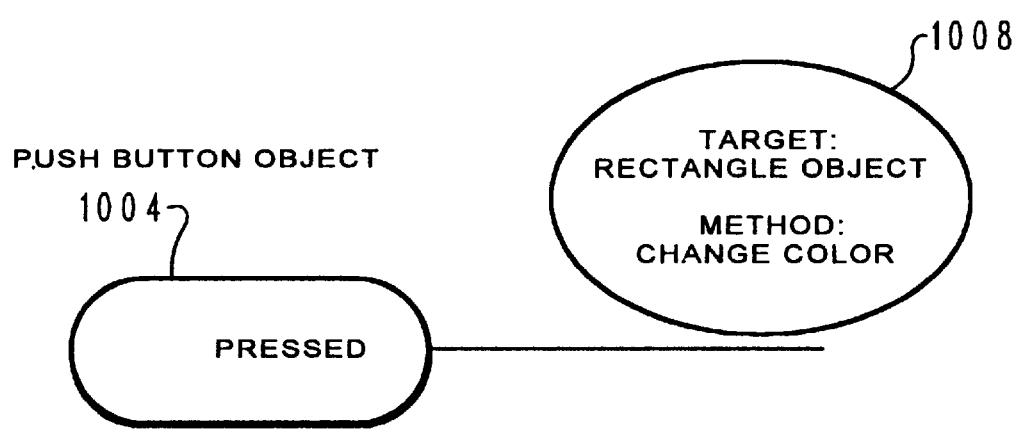
FIG. 11 is a diagram showing the action object as a push button object operating on a rectangular object to change color in accordance with the present invention.

Referring now to FIGS. 10 and 11, an example will be described. A display screen 1002 may include a push button object 1004 and a rectangle object 1006. The desired action is when the push button is pressed, the color of a rectangle object 1006 should change by sending a "change color" message to the rectangle object 1006. The push button object may have an action slot named "pressed" and another action named "released". When push button 1004 is pressed, such as by action of cursor control mouse 18 (see FIG. 1), each of the action objects in action slot named "pressed" is then executed.

The "pressed" action slot may contain one or more action objects to perform the functions on the target object desired by the user. A method action object 1008 (see FIG. 11) includes the rectangle object 1006 as the target and "change_color" as the method name. This method action object 1008 will be part of the persistent state of the push button, thus this action object will be saved from execution to execution so that whenever push button 1004 is pressed, the pressed action slot will be triggered causing the triggering of method action object 1008 which changes the color of rectangular object 1006.

Figure 12:
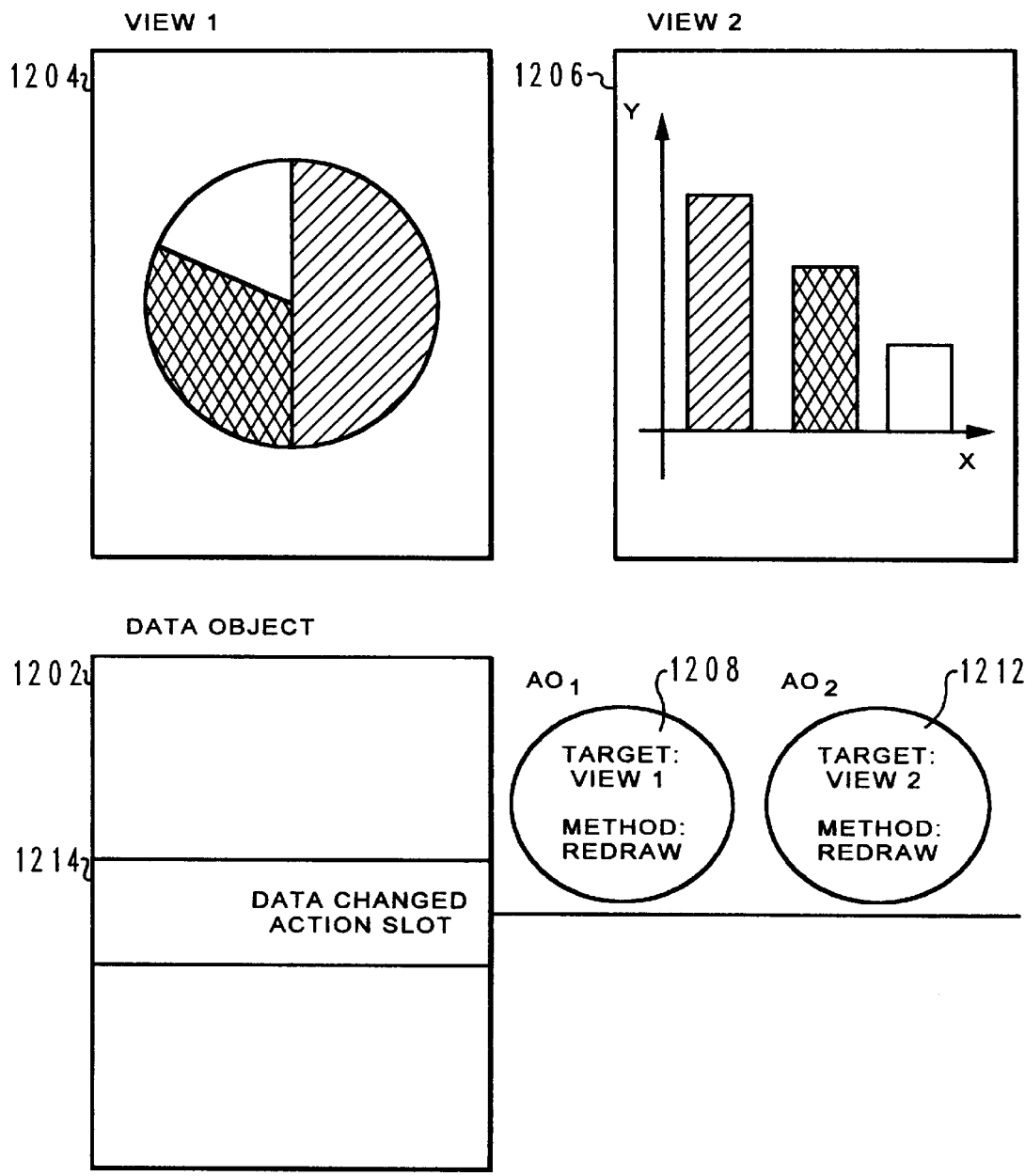
FIG. 12 is a schematic diagram showing a data object with two action objects where each action object relates to a different view of the data object in accordance with the present invention.

Referring now to FIG. 12, different views of a data object are shown with the relationship of the data object and the views to the action objects. Data object 1202 may be presented in two views: view 1, 1204 and view 2, 1206, respectively. View 1 is controlled by action object 1 1208 and view 2 is controlled by action object 2 1212. View objects 1204 and 1206 register with data object 1202 by adding a method action object to the "data changed" action slot 1214 of data object 1202. Action object 1 1208 and action object 2 1212 are components of data change action slot 1214. When data in data object 1202 is changed, action object 1 1208 is triggered with a target of view 1 and a method of redraw which causes view 1 to be redrawn with the new data in data object 1202. Similarly, view 2 is modified by action object 2 1212 and redrawn with the new data from data object 1202.

The above example illustrates the observability of objects and views in accordance with the present invention through the use of action slots and action objects to revise data in views when, for example, a data object changes.

The present invention, as described above, expands the capabilities of object oriented programming systems over prior art techniques.

While the invention has been particularly shown and described with reference to a preferred embodiment, it will be understood by those skilled in the art that various changes in form and detail may be made therein without departing from the spirit and scope of the invention.

- 19 -

APPENDIX A

```
#include <mlink.idl>
// SOMVPTriggerable class defines objects that are triggerable.
// This is an abstract class, all the methods must be overridden.
interface SOMVPTriggerable : somf_MLinkable
{
  integer4 somvpTrigger(in void **retValue,
                        in SOMObject source,
                        in SOMObject observable,
                        in char *xap,
                        in char *map,
                        in char debugMode);
  // Triggers the triggerable object.
  // If debugMode is equal to SOMVP_TRACE_ACTION, it prints
  // trace information by calling somvpPrint.

void somvpPrint(in SOMObject source, in char debugMode);
  // Prints trace information for the triggerable object.

integer4 somvpGetStringForm(in string buffer, in long bufferLength);
  // Returns a string representation of the triggerable object
  // in the "buffer".
  // If the buffer is not big enough, it returns SOMVP_RETERR.
  // Used to display the trigger object in the debugger.

attribute string somvpObjectKey;
};
```

DOCKET AT9-92-150

- 20 -

```
1  #include <actions.idl>
2
3  // SOMVPSlot defines a slot action object.
4  // It is used to post a message.
5
6  interface SOMVPSlot : SOMVPActions
7  {
8
9  #ifdef __SOMIDL__
10   implementation {
11     somvpTrigger: override;
12     somvpActionKind: override;
13   };
14  #endif /* __SOMIDL__ */
15  };
16
17
18
```

DOCKET AT9-92-150

- 21 -

```
1  #include <actions.idl>
2
3  // This class is used to create a script action object.
4  // Source and target objects are two parameters passed to the
5  // script as the last two parameters implicitly.
6
7  interface SOMVPScript : SOMVPActions
8  {
9
10 #ifdef __SOMIDL__
11   implementation {
12     somvpTrigger: override;
13     somvpActionKind: override;
14     somvpGetStringForm: override;
15   };
16 #endif /* __SOMIDL__ */
17 };
18
19
```

- 22 -

```
1   #include <actions.idl>
2
3   // SOMVPProc defines a procedure action object, that can be used
4   // to invoke a fixed signature entry in a dynamic library(DLL).
5
6   interface SOMVPProc : SOMVPActions
7   {
8
9   #ifdef __SOMIDL__
10    implementation {
11      somvpTrigger: override;
12      somvpActionKind: override;
13    };
14  #endif /* __SOMIDL__ */
15  };
16
17
```

- 23 -

```
1  #include <actions.idl>
2
3  // SOMVPMethod defines an action object, that can be used to
4  // invoke methods with the following signature:
5  //     void methodName(SOMObject *target, Environment* ev, SOMObject
6  *source);
7  // This is a light weight method action object, it does not
8  // validate the method signature. Client code has to make sure
9  // that method has the expected signature.
10
11 interface SOMVPMethod : SOMVPActions
12 {
13
14 #ifdef __SOMIDL__
15   implementation {
16     somvpTrigger: override;
17     somvpActionKind: override;
18   };
19 #endif /* __SOMIDL__ */
20 };
21
```

- 24 -

```
1   #include  <context.idl>
2
3   interface somf_TPrimitiveLinkedList;
4   interface SOMVPActions;
5   interface SOMVPActionSlot;
6
7   // SOMVPObservable  object has action slots that can be triggered.
8   // The trigger of a named action slot, causes the trigger
9   // of the action objects located in the corresponding action slot.
10
11  interface SOMVPObservable  : SOMObject
12  {
13    somf_TPrimitiveLinkedList  somvpGetActionSlotTable();
14    // Returns the action slot table.
15    // This is a list of action slots and each action slot(SOMVPActionSlot)
16    // is identified with a unique name.
17
18    integer4 somvpAddSlot(in string slotName);
19    // Adds a new action slot to the observable object.
20    // It will update actionSlotTable.
21
22    void somvpTriggerSlot(in SOMObject source, in string slotName,
23                          in char *xap, in char *map);
24    // Triggers the named action slot.
25    // It will cause the trigger of the action objects located
26    // in the named action slot.
27
28    integer4 somvpFreeAction(in string slotName, in SOMVPActions action);
29    // It will remove the action object from the action slot.
30    // The caller needs to do "somFree" on the action object(action)
```

```
1    // if it is needed. This interface does not free the specified
2    // action object, it simply removes it from the action slot.
3
4    integer4 somvpRemoveTargetAction(in   string slotName, in SOMObject
5    target);
6    // It will remove the action objects with the specified
7    // target from the action slot.
8    // The action objects with the corresponding target are freed.
9
10   integer4 somvpFreeSlot(in string slotName);
11   // The somvpFreeSlot method will remove an action slot & its
12   // corresponding action objects from observable object.
13   // It will update actionSlotTable.
14   // The caller is responsible for freeing the action objects in the
15   // action slot that is being removed.
16
17   integer4 somvpAddActionObject(in  string slotName,
18                                 in SOMVPActions actionsObject);
19   // It adds an action object in to the slot named.
20   // First it will search for the named slot, if it does not
21   // exist yet, it will create one.
22   // It is important to provide this interface for action
23   // object extendability(i.e. new action objects can be created
24   // by subclassing SOMVPActions class, they will be inserted to the
25   // observable object through this interface.)
26
27   SOMVPActionSlot somvpGetSlot(in string slotName);
28   // It will return the specified action slot if it is found.
29   // It will return NULL, if it can not be found.
30
```

- 26 -

```
1    integer4 somvpAddMethodActionObject(in    string slotName,
2                         in SOMObject target, in string methodName);
3    // Adds a method action object(SOMVPMethod) to the specified slot.
4
5    integer4 somvpAddScriptActionObject(in    string slotName,
6                         in SOMObject target, in string scriptString);
7    // Adds a script action object(SOMVPScript) to the specified slot.
8
9    integer4 somvpAddSlotActionObject(in    string slotName,
10                        in SOMObject target, in string slot);
11   // Adds a slot action object(SOMVPSlot) to the specified slot.
12
13   #ifdef __SOMIDL__
14     implementation {
15       //# Internal Instance Variables
16       somf_TPrimitiveLinkedList actionSlotTable;
17       // it is a list of action slots
18       // each action slot is identified
19       // with a unique name.
20
21       somInit: override;
22       somUninit: override;
23       somDumpSelfInt: override;
24     };
25   #endif /* __SOMIDL__ */
26   };
27
```

DOCKET AT9-92-150

- 27 -

```
1   #include <tpll.idl>
2   #include <trigger.idl>
3
4   // SOMVPActionSlot defines an action slot. The actions slots
5   // are linked lists which contains action objects.
6   // Both action slots and action objects are triggerable objects.
7   // The trigger of an action slot causes the trigger of the
8   // action objects it holds.
9
10  interface SOMVPActions;
11
12  interface SOMVPActionSlot : SOMVPTriggerable, somf_TPrimitiveLinkedList
13  {
14      integer4 somvpAddAO(in SOMVPActions ao);
15      // Adds an action object to the action slot.
16
17      void somvpRemoveAO(in SOMObject target);
18      // Removes the action objects with a given target.
19      // It frees such action objects by calling "somFree"
20      // method on them.
21
22      void somvpFreeAO(in SOMVPActions ao);
23      // Deletes the action object(ao) from the action slot,
24      // It does not delete the action object. The caller needs
25      // to free it by calling "somFree"" if it is needed.
26
27  #ifdef __SOMIDL__
28      implementation {
29          somvpTrigger: override;
30          somUninit: override;
```

DOCKET AT9-92-150

- 28 -

```
1   };
2   #endif /* __SOMIDL__ */
3   };
4
```

- 29 -

```
1   #include <trigger.idl>
2
3   // SOMVPActions defines an abstract action object class.
4   // Subclass this to create action objects.
5
6   interface SOMVPActions : SOMVPTriggerable
7   {
8     string somvpActionKind();
9     // Returns a string representation for the action object kind.
10    // The ownership of the string stays with the object.
11    // Used in the debugger to display the action kind.
12
13    attribute SOMObject somvpTarget;
14    // The action object target. The action objects are
15    // associated with the links which are defined
16    // by using a <source object, target object> pair.
17
18  #ifdef __SOMIDL__
19    implementation {
20      somPrintSelf: override;
21      somvpGetStringForm: override;
22    };
23  #endif /* __SOMIDL__ */
24  };
```

- 30 -

```
1   #define SOMVPTriggerable_Class_Source
2   #include <trigger.ih>
3   #include <somvpstr.h>
4   #include <somvpinc.h>
5
6   SOM_Scope integer4 SOMLINK somvpTrigger(SOMVPTriggerable *somSelf,
7                                       Environment *ev, void** retValue,
8                                       SOMObject* source,
9                                       SOMObject* observable,
10                                      char* xap, char* map,
11                                      char debugMode)
12  {
13      SOMVPTriggerableMethodDebug("SOMVPTriggerable","somvpTrigger");
14      /* MUSTOVERRIDE */
15      return(SOMVP_RETERR);
16  }
17
18  SOM_Scope void SOMLINK somvpPrint(SOMVPTriggerable *somSelf,
19          Environment *ev,
20          SOMObject* source,
21          char debugMode)
22  {
23      somMethodPtr   methodPtr;
24      string name;
25      SOMVPTriggerableMethodDebug("SOMVPTriggerable","somvpPrint");
26
27      somPrintf("\n......Start the trace of action object ............\n");
28      _somPrintSelf(somSelf);
29
30      if(source != NULL){
```

- 31 -

```
1     _somFindMethod(_somGetClass(source),
2                 somIdFromString("_get_somvpObjectKey"),
3                 &methodPtr) ;
4     if(methodPtr == NULL){
5     somPrintf("Action Source Object Address = %08lX\n", source);
6     }
7     else{
8       name = __get_somvpObjectKey(source, ev);
9       if(name != NULL)
10        somPrintf("Action Source Name = %s (Address:%08lX)\n",
11              __get_somvpObjectKey(source, ev), source);
12      }
13    }
14    somPrintf("Action Debug Mode = %c\n", debugMode);
15    somPrintf(".....End the trace of action object ............\n\n");
16 }
17
18 SOM_Scope integer4  SOMLINK somvpGetStringForm(SOMVPTriggerable
19 *somSelf,
20 Environment *ev,
21       string buffer, long bufferLength)
22 {
23     /* SOMVPTriggerableData *somThis =
24 SOMVPTriggerableGetData(somSelf);   */
25
26 SOMVPTriggerableMethodDebug("SOMVPTriggerable","somvpGetStringFor
27 m");
28    /* MUSTOVERRIDE */
29    return(SOMVP_RETERR);
30 }
```

DOCKET AT9-92-150

- 32 -

```
1   #define SOMVPSlot_Class_Source
2   #include "slot.ih"
3   #include <somcls.h>
4   #include <somvpstr.h>
5   #include <somvpinc.h>
6   #include <vpdebinc.h>
7   #include <ups.h>
8
9   SOM_Scope   integer4   SOMLINK   somvpTrigger(SOMVPSlot   *somSelf,
10  Environment *ev,
11              void **retValue,
12                  SOMObject *source,
13                  SOMObject *observable,
14                  char* xap, char* map,
15                  char debugMode)
16  {
17      char *name;
18      SOMObject *target;
19      somMethodPtr methodPtr;
20      SOMGMessagePoster *ups = SOMGMessagePosterNew();
21      SOMVPSlotMethodDebug ("SOMVPSlot","somvpTrigger");
22
23      if(debugMode == SOMVP_TRACE_ACTION)
24        _somvpPrint(somSelf, ev, source, debugMode);
25
26      name = __get_somvpObjectKey(somSelf, ev);
27      target = __get_somvpTarget (somSelf, ev);
28      if(target == NULL) return(SOMVP_RETERR);
29
30      _somFindMethod(_somGetClass(target),
```

- 33 -

```
1           somIdFromString("somvpTriggerSlot"), &methodPtr) ;
2      if(methodPtr == NULL) return(SOMVP_RETERR);
3
4      ((void (*)( SOMObject *, Environment *, char *, char)) (methodPtr))
5                   (target, ev, name, debugMode);
6
7      return (SOMVP_RETOK);
8  }
9
10 SOM_Scope  string   SOMLINK  somvpActionKind(SOMVPSlot  *somSelf,
11 Environment *ev)
12 {
13     static char *kind = "slot";
14     SOMVPSlotMethodDebug("SOMVPSlot","somvpActionKind");
15     return(kind);
16 }
17
18
```

- 34 -

```
1   #define  SOMVPScript_Class_Source
2   #include  <script.ih>
3   #include  <callobj.h>
4   #include  <extlang.h>
5   #include  <somcdict.h>
6   #include  <context.h>
7   #include  <vpdebinc.h>
8   #include  <somvpstr.h>
9   #include  <somvpinc.h>
10
11  SOM_Scope integer4  SOMLINK somvpTrigger(SOMVPScript *somSelf,
12              Environment *ev,
13                void **retValue,
14                SOMObject* source,
15                SOMObject* observable,
16              char* xap, char* map,
17                char debugMode)
18  {
19      SOMVPScriptData *somThis = SOMVPScriptGetData(somSelf);
20      SOMObject *target;
21      char *script;
22      short rt;
23      SOMObject somvpScriptCode;
24      SOMVPScriptMethodDebug("SOMVPScript","somvpTrigger");
25
26      if(debugMode  == SOMVP_TRACE_ACTION)
27        _somvpPrint(somSelf, ev, source, debugMode);
28
29      script = __get_somvpObjectKey(somSelf, ev);
30      _somvpExtSomTranslateScript(__get_somvpExtLangEnv(somSelf,   ev),
```

DOCKET AT9-92-150

- 35 -

```
1                        &somvpScriptCode, script);
2    target = __get_somvpTarget (somSelf, ev);
3
4    /* execute the script */
5    rt=(SOMVPDictionary *)_somvpExtSomExecute(
6         __get_somvpExtLangEnv(somSelf, ev),
7       somvpScriptCode, source, target);
8
9    return(rt);
10 }
11
12 SOM_Scope string   SOMLINK  somvpActionKind(SOMVPScript   *somSelf,
13 Environment *ev)
14 {
15    SOMVPScriptData *somThis = SOMVPScriptGetData(somSelf);
16    static char *kind = "script";
17    SOMVPScriptMethodDebug("SOMVPScript","somvpActionKind");
18    return(kind);
19 }
20
21 SOM_Scope   integer4    SOMLINK   somvpGetStringForm(SOMVPScript
22 *somSelf, Environment *ev,
23               string buffer, long bufferLength)
24 {
25    SOMVPScriptData *somThis = SOMVPScriptGetData(somSelf);
26    char *kind;
27    SOMVPScriptMethodDebug("SOMVPScript","somvpGetStringForm");
28
29    kind = _somvpActionKind(somSelf, ev);
30    strcpy(buffer, "(");
```

- 36 -

```
1    strcat(buffer, kind);
2    strcat(buffer, ") ");
3    strcat(buffer, " ON ");
4    strcat(buffer, __get_somvpObjectKey((__get_somvpTarget   (somSelf, ev)),
5  ev));
6    return (SOMVP_RETOK);
7  }
8
9
```

- 37 -

```
1   #define  SOMVPProc_Class_Source
2   #include  <proc.ih>
3   #include  <somvpinc.h>
4   #include  <vpdebinc.h>
5
6   /* The following is implementation for AIX, */
7   /* Other platforms like OS/2 and Windows    */
8   /* are implemented in the same way.         */
9
10  SOM_Scope integer4 SOMLINK somvpTrigger(SOMVPProc *somSelf,
11          Environment *ev,
12              void **retValue,
13          SOMObject* source,
14          SOMObject* observable,
15              char* xap, char* map,
16          char debugMode)
17  {
18      SOMVPProcData *somThis = SOMVPProcGetData(somSelf);
19      SOMObject *target;
20      char *fileName;
21      somToken loadVal;
22      typedef int (*CreateFun) (void *, void **, void *, void *);
23      CreateFun dynamicFun;
24      int rc;
25      SOMVPProcMethodDebug("SOMVPProc","somvpTrigger");
26
27      if(debugMode == SOMVP_TRACE_ACTION){
28        printf("Parameter dump before the procedure call\n");
29        _somvpPrint(somSelf, ev, source, debugMode);
30      }
```

- 38 -

```
1    target = __get_somvpTarget (somSelf, ev);
2    fileName = __get_somvpObjectKey(somSelf, ev);
3
4    if ((loadVal = load (fileName, 0, (char *) 0)) == (somToken)NULL)
5      return (SOMVP_RETERR);
6    else {
7      dynamicFun = (CreateFun) loadVal;
8      rc = dynamicFun (target, retValue, source, target);
9      return(rc);
10   }
11 }
12 SOM_Scope string  SOMLINK  somvpActionKind(SOMVPProc  *somSelf,
13 Environment *ev)
14 {
15   char *kind = "proc";
16   SOMVPProcMethodDebug("SOMVPProc","somvpActionKind");
17   return(kind);
18 }
```

- 39 -

```
1   #define  SOMVPMethod_Class_Source
2   #include  "method.ih"
3   #include  <somcls.h>
4   #include  <somvpstr.h>
5   #include  <somvpinc.h>
6   #include  <vpdebinc.h>
7
8   typedef void   SOMLINK  somTP_FixedMethodPtr  (SOMObject  *,
9   Environment*, SOMObject
10  *);
11  typedef somTP_FixedMethodPtr  *somTD_FixedMethodPtr;
12
13  SOM_Scope integer4 SOMLINK somvpTrigger (SOMVPMethod *somSelf,
14  Environment *ev,
15            void **retValue,
16                SOMObject *source,
17                SOMObject *observable,
18                char* xap, char* map,
19                char debugMode)
20  {
21      somTD_FixedMethodPtr  methodPtr;
22      SOMObject *target;
23      SOMVPMethodMethodDebug  ("SOMVPMethod","somvpTrigger");
24
25      if(debugMode == SOMVP_TRACE_ACTION)
26        _somvpPrint(somSelf, ev, source, debugMode);
27
28      target = __get_somvpTarget (somSelf, ev);
29      if(target == NULL) return(SOMVP_RETERR);
30      _somFindMethod(_somGetClass(target),
```

DOCKET AT9-92-150

- 40 -

```
1             somIdFromString(__get_somvpObjectKey(somSelf,  ev)),
2                  (somMethodPtr*)(&methodPtr)   ) ;
3      if(methodPtr  = = NULL) {
4         /* SOMVP_ERROR(SOMVPVP_UNDEFINEDMETHOD);*/
5         return(SOMVP_RETERR);
6      }
7      methodPtr(target,  ev, source);
8      return (SOMVP_RETOK);
9    }
10
11   SOM_Scope string  SOMLINK  somvpActionKind(SOMVPMethod   *somSelf,
12   Environment
13   *ev)
14   {
15      static char *kind = "method";
16      SOMVPMethodMethodDebug("SOMVPMethod","somvpActionKind");
17      return(kind);
18   }
```

- 41 -

```
1   #define SOMVPActionSlot_Class_Source
2   #include  "actnslot.ih"
3   #include  <actions.h>
4   #include  <tpll.h>
5   #include  <callobj.h>
6
7   #define VPDEBINC_H_Source
8   #include  <vpdebinc.h>
9   #include  <somvpstr.h>
10  #include  <somvpinc.h>
11
12  SOM_Scope integer4 SOMLINK somvpAddAO(SOMVPActionSlot   *somSelf,
13          Environment *ev, SOMVPActions* ao)
14  {
15      /* SOMVPActionSlotData  *somThis  =
16  SOMVPActionSlotGetData(somSelf);   */
17      SOMVPActionSlotMethodDebug("SOMVPActionSlot","somvpAddAO");
18      _somfAddLast(somSelf, ev, ao);
19      return (SOMVP_RETOK);
20  }
21
22  SOM_Scope void SOMLINK somvpRemoveAO(SOMVPActionSlot    *somSelf,
23          Environment *ev, SOMObject* target)
24  {
25      /* SOMVPActionSlotData  *somThis  =
26  SOMVPActionSlotGetData(somSelf);   */
27      SOMVPActions *actObj;
28      SOMVPActions *temp;
29      SOMVPActionSlotMethodDebug ("SOMVPActionSlot","somvpRemoveAO");
30
```

```
1    actObj = _somfFirst(somSelf, ev);
2    while(actObj !=NULL) {
3      temp = actObj;
4      actObj = _somfAfter(somSelf, ev, actObj);
5      if(__get_somvpTarget (temp, ev) == target) {
6        _somfRemove(somSelf, ev, temp);
7        _somFree(temp);
8      }
9    }
10 }
11
12 SOM_Scope void SOMLINK somvpFreeAO(SOMVPActionSlot   *somSelf,
13         Environment *ev, SOMVPActions* ao)
14 {
15     /* SOMVPActionSlotData *somThis =
16 SOMVPActionSlotGetData(somSelf);  */
17    SOMVPActions *actObj;
18    SOMVPActionSlotMethodDebug("SOMVPActionSlot","somvpFreeAO");
19
20    actObj = _somfFirst(somSelf, ev);
21    while(actObj !=NULL) {
22      if(actObj == ao) {
23        _somfRemove(somSelf, ev, actObj);
24        return;
25      }
26      actObj = _somfAfter(somSelf, ev, actObj);
27    }
28 }
29
30 SOM_Scope void SOMLINK somUninit(SOMVPActionSlot   *somSelf)
```

- 43 -

```
1  {
2       /* SOMVPActionSlotData *somThis =
3  SOMVPActionSlotGetData(somSelf);   */
4       SOMVPActions *actObj;
5       Environment *ev = somGetGlobalEnvironment();
6       SOMVPActionSlotMethodDebug("SOMVPActionSlot","somUninit");
7
8       actObj = _somfFirst(somSelf, ev);
9       while(actObj !=NULL) {
10        _somfRemove(somSelf, ev, actObj);
11        _somFree(actObj);
12        actObj = _somfFirst(somSelf, ev);
13      }
14      SOMVPActionSlot_parent_SOMVPTriggerable_somUninit(somSelf);
15      SOMVPActionSlot_parent_som_f_TPrimitiveLinkedList_somUninit(somSelf);
16 }
17
18 SOM_Scope integer4 SOMLINK somvpTrigger(SOMVPActionSlot *somSelf,
19           Environment *ev,
20        void **retValue,
21        SOMObject* source,
22        SOMObject* observable,
23           char* xap, char* map,
24        char debugMode)
25 {
26      /* SOMVPActionSlotData *somThis =
27 SOMVPActionSlotGetData(somSelf);   */
28      SOMVPActions *actObj;
29      int rt = SOMVP_RETERR;
30      SOMVPActionSlotMethodDebug("SOMVPActionSlot","somvpTrigger");
```

DOCKET AT9-92-150

- 44 -

```
1    if(somvpGlobalDebugObject != NULL){
2      rt = _somvpPushSlotActivation(somvpGlobalDebugObject, ev, source,
3                         __get_somvpObjectKey(somSelf, ev));
4    }
5    if(rt == SOMVP_RETERR) {
6      actObj = _somfFirst(somSelf, ev);
7      while(actObj !=NULL) {
8        _somvpTrigger(actObj, ev, retValue, source,
9                       observable,xap,map,debugMode);
10       actObj = _somfAfter(somSelf, ev, actObj);
11     }
12   }
13   return(SOMVP_RETOK);
14 }
```

- 45 -

```
1   #define SOMVPActions_Class_Source
2   #include <actions.ih>
3   #include <somvpstr.h>
4   #include <somvpinc.h>
5
6   SOM_Scope string SOMLINK somvpActionKind(SOMVPActions  *somSelf,
7   Environment
8   *ev)
9   {
10      SOMVPActionsData  *somThis = SOMVPActionsGetData(somSelf);
11      static char *kind = "actions";
12      SOMVPActionsMethodDebug("SOMVPActions","somvpActionKind");
13      return(kind);
14  }
15
16
17  SOM_Scope SOMObject* SOMLINK somPrintSelf(SOMVPActions *somSelf)
18  {
19      SOMVPActionsData  *somThis = SOMVPActionsGetData(somSelf);
20      SOMObject *target;
21      char *name;
22      char *kind;
23      somMethodPtr   methodPtr;
24      Environment *ev = somGetGlobalEnvironment();
25      SOMVPActionsMethodDebug("SOMVPActions","somPrintSelf");
26
27      target = __get_somvpTarget (somSelf, ev);
28      name = __get_somvpObjectKey(somSelf, ev);
29      kind = _somvpActionKind(somSelf, ev);
30      if(kind != NULL)
```

- 46 -

```
1      somPrintf("Action Kind = %s\n", kind);
2      if(name != NULL)
3       somPrintf("Action Name = %s\n", name);
4      if(target != NULL){
5       _somFindMethod(_somGetClass(target),
6                somIdFromString("_get_somvpObjectKey"),
7                &methodPtr) ;
8       if(methodPtr == NULL){
9        somPrintf("Action Target Object Address = %08lX\n", target);
10      }
11      else{
12       name = __get_somvpObjectKey(target, ev);
13       if(name != NULL)
14        somPrintf("Action Target Name = %s (Address:%08lX)\n",
15                __get_somvpObjectKey(target, ev), target);
16      }
17      }
18     return(somSelf);
19    }
20    SOM_Scope integer4   SOMLINK  somvpGetStringForm(SOMVPActions
21    *somSelf,
22             Environment *ev,
23          string buffer, long bufferLength)
24    {
25      SOMVPActionsData *somThis = SOMVPActionsGetData(somSelf);
26      char *kind;
27      SOMObject *target;
28      somMethodPtr methodPtr;
29      SOMVPActionsMethodDebug("SOMVPActions","somvpGetStringForm");
30
```

DOCKET AT9-92-150

- 47 -

```
1    kind = _somvpActionKind(somSelf, ev);
2    strcpy(buffer, "(");
3    strcat(buffer, kind);
4    strcat(buffer, ") ");
5
6    _somFindMethod(_somGetClass(somSelf),
7                   somIdFromString("_get_somvpObjectKey"),
8                   &methodPtr) ;
9    if(methodPtr != NULL){
10     strcat(buffer, __get_somvpObjectKey(somSelf, ev));
11   }
12
13   strcat(buffer, " ON ");
14
15   target = __get_somvpTarget (somSelf, ev);
16   if(target != NULL){
17     _somFindMethod(_somGetClass(target),
18                    somIdFromString("_get_somvpObjectKey"),
19                    &methodPtr) ;
20     if(methodPtr != NULL){
21       strcat(buffer, __get_somvpObjectKey(target, ev));
22     }
23   }
24   return (SOMVP_RETOK);
25 }
26
```

- 48 -

```
1   #define SOMVPObservable_Class_Source
2   #include "observable.ih"
3   #include <actnslot.h>
4   #include <method.h>
5   #include <script.h>
6   #include <slot.h>
7   #include <somvpstr.h>
8   #include <somvpinc.h>
9   #include <vpdebinc.h>
10
11  #define SOMVP_RETWARN   1
12
13  SOM_Scope  integer4     SOMLINK
14  somvpAddMethodActionObject(SOMVPObservable
15  *somSelf,
16                              Environment *ev,
17                              string slotName,
18                              SOMObject* target,
19                              string methodName)
20  {
21      SOMVPObservableData *somThis =SOMVPObservableGetData(somSelf);
22      SOMVPMethod *method = SOMVPMethodNew();
23  SOMVPObservableMethodDebug("SOMVPObservable","somvpAddMethodA
24  ctionObject");
25
26      __set_somvpTarget (method, ev, target);
27      __set_somvpObjectKey(method, ev, methodName);
28      return(_somvpAddActionObject(somSelf, ev, slotName, method));
29  }
30
```

DOCKET AT9-92-150

- 49 -

```
1   SOM_Scope    integer4         SOMLINK
2   somvpAddScriptActionObject(SOMVPObservable
3   *somSelf,
4                                     Environment *ev,
5                                     string slotName,
6                                     SOMObject* target,
7                                     string scriptString)
8   {
9       SOMVPObservableData  *somThis =SOMVPObservableGetData(somSelf);
10      SOMVPScript  *script = SOMVPScriptNew();
11
12  SOMVPObservableMethodDebug("SOMVPObservable","somvpAddScriptAct
13  ionObject");
14
15      __set_somvpTarget (script, ev, target);
16      __set_somvpObjectKey(script, ev, scriptString);
17      return(_somvpAddActionObject(somSelf,   ev, slotName, script));
18  }
19
20  SOM_Scope    integer4         SOMLINK
21  somvpAddSlotActionObject(SOMVPObservable    *somSelf,
22                                     Environment *ev,
23                                     string slotName,
24                                     SOMObject* target,
25                                     string slot)
26  {
27      SOMVPObservableData  *somThis =SOMVPObservableGetData(somSelf);
28      SOMVPSlot  *slotAO = SOMVPSlotNew();
```

- 50 -

```
1
2    SOMVPObservableMethodDebug("SOMVPObservable","somvpAddSlotActio
3    nObject");
4
5      _set_somvpTarget (slotAO, ev, target);
6      _set_somvpObjectKey(slotAO,  ev, slot);
7      return(_somvpAddActionObject(somSelf,   ev, slotName, slotAO));
8    }
9
10   SOM_Scope void  SOMLINK somInit(SOMVPObservable  *somSelf)
11   {
12      SOMVPObservableData *somThis =SOMVPObservableGetData(somSelf);
13      SOMVPObservableMethodDebug("SOMVPObservable","somInit");
14      SOMVPObservable_parent_SOMVPKeyed_somInit(somSelf);
15      SOMVPObservable_parent_SOMVPContext_somInit(somSelf);
16      _actionSlotTable  =  somf_TPrimitiveLinkedListNew();
17   }
18
19   SOM_Scope void  SOMLINK somUninit(SOMVPObservable  *somSelf)
20   {
21      SOMVPObservableData *somThis =SOMVPObservableGetData(somSelf);
22      SOMVPActionSlot *slot;
23      Environment *ev = somGetGlobalEnvironment();
24      SOMVPObservableMethodDebug("SOMVPObservable","somUninit");
25
26      if (_actionSlotTable){
27        slot = _somfFirst(_actionSlotTable, ev);
28        while(slot != NULL){
29          _somfRemove(_actionSlotTable,  ev, slot);
30          _somFree(slot);
```

- 51 -

```
1       slot = _somfFirst(_actionSlotTable, ev);
2     }
3     _somFree(_actionSlotTable);
4   }
5   SOMVPObservable_parent_SOMVPKeyed_somUninit(somSelf);
6   SOMVPObservable_parent_SOMVPContext_somUninit(somSelf);
7 }
8
9 SOM_Scope integer4 SOMLINK somvpAddSlot(SOMVPObservable *somSelf,
10                                         Environment *ev,
11                                         string slotName)
12 {
13   SOMVPActionSlot *slot;
14   SOMVPObservableData *somThis =SOMVPObservableGetData(somSelf);
15   SOMVPObservableMethodDebug("SOMVPObservable","somvpAddSlot");
16
17   if(_somvpGetSlot(somSelf, ev, slotName)){
18     return SOMVP_RETWARN;
19   } /* endif */
20   slot = SOMVPActionSlotNew();
21   __set_somvpObjectKey(slot, ev, slotName);
22   _somfAddLast(_actionSlotTable, ev, slot);
23   return (int) SOMVP_RETOK;
24 }
25
26 SOM_Scope void SOMLINK somvpTriggerSlot(SOMVPObservable *somSelf,
27                                         Environment *ev,
28                                         SOMObject *source,
29                                         string slotName,
30                                         char *xap, char *map)
```

DOCKET AT9-92-150

- 52 -

```
1   {
2       SOMVPObservableData  *somThis =SOMVPObservableGetData(somSelf);
3       SOMVPActionSlot  *slot;
4       double  retValue;
5       SOMVPObserva bleMethodDebug("SOMVPObservable","somvpTriggerSlot");
6
7       slot = _somvpGetSlot(somSelf, ev, slotName);
8       if (slot)
9         _somvpTrigger(slot, ev, (void **)&retValue,
10              source, somSelf, xap, map, SOMVP_RUN_ACTION);
11  }
12
13  SOM_Scope    integer4    SOMLINK   somvpFreeAction(SOMVPObservable
14  *somSelf,
15                                  Environment *ev,
16                                  string slotName,
17                                  SOMVPActions* action)
18  {
19      SOMVPActionSlot  *slot;
20      SOMVPObservableData  *somThis =SOMVPObservableGetData(somSelf);
21      SOMVPObse rvableMethodDebug("SOMVPObservable","somvpFreeAction");
22
23      slot = _somvpGetSlot(somSelf, ev, slotName);
24      if (slot) {
25        _somvpFreeAO(slot, ev, action);
26        return SOMVP_RETOK;
27      } else {
28        return SOMVP_RETWARN;
29      } /* endif */
30  }
```

```
1  SOM_Scope  integer4      SOMLINK
2  somvpRemoveTargetAction(SOMVPObservable   *somSelf,
3                                            Environment *ev,
4                                            string slotName,
5                                            SOMObject* target)
6  {
7    SOMVPObservableData *somThis =SOMVPObservableGetData(somSelf);
8    SOMVPActionSlot *slot;
9
10 SOMVPObservableMethodDebug("SOMVPObservable","somvpRemoveActio
11 n");
12
13   slot = _somvpGetSlot(somSelf, ev, slotName);
14   if (slot) {
15     _somvpRemoveAO(slot, ev, target);
16     return SOMVP_RETOK;
17   } else {
18     return SOMVP_RETWARN;
19   }
20 }
21
22 SOM_Scope integer4 SOMLINK somvpFreeSlot(SOMVPObservable  *somSelf,
23                                            Environment *ev,
24                                            string slotName)
25 {
26   SOMVPActionSlot *slot;
27   SOMVPObservableData *somThis =SOMVPObservableGetData(somSelf);
28   SOMVPObservableMethodDebug("SOMVPObservable","somvpFreeSlot");
29
30   slot = _somfFirst(_actionSlotTable, ev);
```

- 54 -

```
1    while(slot != NULL){
2      if(strcmp(__get_somvpObjectKey(slot,  ev), slotName) == 0){
3        _somfRemove(_actionSlotTable,  ev, slot);
4        _somFree(slot);
5        return(SOMVP_RETOK);
6      }
7      slot = _somfAfter(_actionSlotTable,  ev, slot);
8    }
9    return(SOMVP_RETWARN);
10 }
11
12 SOM_Scope integer4 SOMLINK somvpAddActionObject(SOMVPObservable
13 *somSelf,
14                                                  Environment *ev,
15                                                  string slotName,
16                                                  SOMVPActions* actionsObject)
17 {
18   int rt;
19   SOMVPActionSlot *slot;
20   SOMVPObservableData *somThis =SOMVPObservableGetData(somSelf);
21
22 SOMVPObservableMethodDebug("SOMVPObservable","somvpAddActionOb
23 ject");
24
25   slot = _somvpGetSlot(somSelf,  ev, slotName);
26   if (slot == NULL) {
27     rt = _somvpAddSlot(somSelf,  ev, slotName);
28     slot = _somvpGetSlot(somSelf,  ev, slotName);
29   }
30   _somvpAddAO(slot,  ev, actionsObject);
```

DOCKET AT9-92-150

```
1    return SOMVP_RETOK;
2  }
3
4  SOM_Scope  somf_TPrimitiveLinkedList*    SOMLINK
5  somvpGetActionSlotTable(
6                          SOMVPObservable *somSelf,Environment
7  *ev)
8  {
9    SOMVPObservableData *somThis =SOMVPObservableGetData(somSelf);
10
11 SOMVPObservableMethodDebug("SOMVPObservable","somvpGetActionSlo
12 tTable");
13
14   return (somf_TPrimitiveLinkedList*) _actionSlotTable;
15 }
16
17 SOM_Scope SOMObject*   SOMLINK somvpGetSlot(SOMVPObservable
18 *somSelf,
19                          Environment *ev,
20                          string slotName)
21 {
22   SOMVPObservableData *somThis =SOMVPObservableGetData(somSelf);
23   int i;
24   SOMVPActionSlot *slot;
25   SOMVPObservableMethodDebug("SOMVPObservable","somvpGetSlot");
26
27   slot = _somfFirst(_actionSlotTable, ev);
28   while(slot != NULL){
29     if(strcmp(__get_somvpObjectKey(slot, ev), slotName) == 0)
30       return(slot);
```

- 56 -

```
1      slot = _somfAfter(_actionSlotTable, ev, slot);
2    }
3    return (NULL);
4  }
5
6  SOM_Scope void SOMLINK somDumpSelfInt(SOMVPObservable *somSelf,
7                          long level)
8  {
9    SOMVPObservableData *somThis =SOMVPObservableGetData(somSelf);
10   SOMVPObservableMethodDeb ug("SOMVPObservable","somDumpSelfInt");
11
12   SOMVPObservable_parent_SOMVPKeyed_somDumpSelfInt(somSelf, level);
13   SOMVPObservable_parent_SOMVPContext_somDumpSelfInt(somSelf,
14 level);
15   somPrefixLevel(level);
16   somPrintf("OBSERVABLE OBJECT DUMP : \n");
17   _somDumpSelf(_actionSlotTable, level);
18 }
19
```

- 57 -

```
1   TESTMETH.C
2   #include <method.h>
3   #include <vpdebinc.h>
4   #include <somvpinc.h>
5   #include <dataobj.h>
6   #include <format1.h>
7
8   /* Test the method action object :              */
9   /* Demonstrates the usage of the method action object by itself */
10
11  main(){
12    SOMVPActions *action1 = SOMVPMethodNew();
13    SOMObject *target;
14    char *info;
15    double result;
16    char *methodName = "displayInUpperCase";
17    char buffer[256];
18    int rt;
19    Environment *ev = somGetGlobalEnvironment();
20    DataObject *dataobj = DataObjectNew();
21    Format1 *format1 = Format1New();
22
23    __set_data(dataobj, ev, "TestString");
24    __set_somvpObjectKey(format1, ev, "format1");
25
26    __set_somvpTarget(action1, ev, format1);
27    __set_somvpObjectKey(action1, ev, methodName);
28    printf("set values %08x %s\n", action1, methodName);
29
30    target = __get_somvpTarget(action1, ev);
```

- 58 -

```
1   info = __get_somvpObjectKey(action1, ev);
2   printf("get values %08x %s\n", target, info);
3
4   printf("print the action object \n");
5   _somPrintSelf(action1);
6
7   printf(" \n DebugMode : trace\n");
8   _somvpTrigger(action1, ev, (void **)&result, dataobj,
9           dataobj, NULL, NULL, SOMVP_TRACE_ACTION);
10
11  printf(" \n DebugMode : run\n");
12  __set_data(dataobj, ev, "AnotherTestString");
13  _somvpTrigger(action1, ev, (void **)&result, dataobj,
14          dataobj, NULL, NULL, SOMVP_RUN_ACTION);
15
16  rt = _somvpGetStringForm(action1, ev, buffer, 256);
17  printf("%s\n", buffer);
18  exit(0);
19  }
```

- 59 -

```
1   TESTOBS1.C
2   #include  <observable.h>
3   #include  <vpdebinc.h>
4   #include  <method.h>
5   #include  <slot.h>
6
7   /* Test the method action object, slot action object and observable object : */
8   /* Demonstrates the usage of the method and slot action objects with the
9    */
10  /* observable objects.                                                    */
11
12  main()
13  {
14      SOMVPObservable  *observableObj1  = SOMVPObservableNew();
15      SOMVPObservable  *observableObj2  = SOMVPObservableNew();
16      SOMVPObservable  *observableObj3  = SOMVPObservableNew();
17      SOMVPObservable  *observableObj4  = SOMVPObservableNew();
18      SOMVPObservable  *observableObj5  = SOMVPObservableNew();
19      SOMVPMethod  *methodAction1  = SOMVPMethodNew();
20      SOMVPMethod  *methodAction2  = SOMVPMethodNew();
21      SOMVPMethod  *methodAction3  = SOMVPMethodNew();
22      SOMVPMethod  *methodAction4  = SOMVPMethodNew();
23      SOMVPMethod  *methodAction5  = SOMVPMethodNew();
24      SOMVPMethod  *methodAction6  = SOMVPMethodNew();
25      SOMVPSlot  *slotAction1  = SOMVPSlotNew();
26      SOMVPSlot  *slotAction2  = SOMVPSlotNew();
27      int rt;
28      Environment *envObj = somGetGlobalEnvironment();
29
30      /* initialize action objects */
```

- 60 -

```
1    __set_somvpObjectKey(methodAction1,  envObj, "somPrintSelf");
2    __set_somvpTarget(methodAction1,    envObj, observableObj1);
3    _somPrintSelf(methodAction1);
4
5    __set_somvpObjectKey(methodAction2,  envObj, "somPrintSelf");
6    __set_somvpTarget(methodAction2,    envObj, observableObj2);
7    _somPrintSelf(methodAction2);
8
9    __set_somvpObjectKey(methodAction3,  envObj, "somPrintSelf");
10   __set_somvpTarget(methodAction3,    envObj, observableObj3);
11   _somPrintSelf(methodAction3);
12
13   __set_somvpObjectKey(methodAction4,  envObj, "somPrintSelf");
14   __set_somvpTarget(methodAction4,    envObj, observableObj4);
15   _somPrintSelf(methodAction4);
16
17   __set_somvpObjectKey(methodAction5,  envObj, "somPrintSelf");
18   __set_somvpTarget(methodAction5,    envObj, observableObj5);
19   _somPrintSelf(methodAction5);
20
21   __set_somvpObjectKey(methodAction6,  envObj, "somPrintSelf");
22   __set_somvpTarget(methodAction6,    envObj, observableObj5);
23   _somPrintSelf(methodAction6);
24
25   __set_somvpObjectKey(slotAction1,  envObj, "slot1");
26   __set_somvpTarget(slotAction1,    envObj, observableObj1);
27   _somPrintSelf(slotAction1);
28
29   __set_somvpObjectKey(slotAction2,  envObj, "slot2");
30   __set_somvpTarget(slotAction2,    envObj, observableObj1);
```

DOCKET AT9-92-150

- 61 -

```
1   _somPrintSelf(slotAction2);
2
3   /* add the action objects to the action slots */
4   _somvpAddActionObject(observableObj1,   envObj, "slot1",methodAction1);
5   _somvpAddActionObject(observableObj1,   envObj, "slot1",methodAction2);
6
7   _somvpAddActionObject(observableObj1,   envObj, "slot2",methodAction3);
8   _somvpAddActionObject(observableObj1,   envObj, "slot2",methodAction4);
9   _somvpAddActionObject(observableObj1,   envObj, "slot2",methodAction5);
10
11  _somvpAddActionObject(observableObj2,   envObj, "slot3",slotAction1);
12  _somvpAddActionObject(observableObj2,   envObj, "slot3",slotAction2);
13  _somvpAddActionObject(observableObj2,   envObj, "slot3",methodAction6);
14
15  /* trigger the action slots */
16  _somvpTriggerSlot(observableObj1, envObj, observableObj2, "slot1",
17                          NULL, NULL);
18  _somvpTriggerSlot(observableObj1, envObj, observableObj2, "slot2",
19                          NULL, NULL);
20  _somvpTriggerSlot(observableObj2, envObj, observableObj2, "slot3",
21                          NULL, NULL);
22
23  _somDumpSelf(observableObj1,1);
24  _somDumpSelf(observableObj2,1);
25  _somDumpSelf(observableObj3,1);
26  _somDumpSelf(observableObj4,1);
27  _somDumpSelf(observableObj5,1);
28
29  /* Free the action object */
30  rt = _somvpFreeAction(observableObj1,   envObj, "slot1",methodAction1);
```

DOCKET AT9-92-150

- 62 -

```
1   _somvpTriggerSlot(observableObj1, envObj, observableObj2, "slot1",
2                             NULL, NULL);
3   rt = _somvpFreeAction(observableObj2, envObj, "slot3",slotAction1);
4   _somvpTriggerSlot(observableObj2, envObj, observableObj2, "slot3",
5                             NULL, NULL);
6
7   _somDumpSelf(observableObj1,1);
8   _somvpTriggerSlot(observableObj1, envObj, observableObj2, "slot2",
9                             NULL, NULL);
10  _somDumpSelf(observableObj1,1);
11  rt  =   _somvpRemoveTargetAction(observableObj1,     envObj,     "slot2",
12  observableObj4);
13  rt  =   _somvpRemoveTargetAction(observableObj1,     envObj,     "slot2",
14  observableObj5);
15  _somvpTriggerSlot(observableObj1, envObj, observableObj2, "slot2",
16                             NULL, NULL);
17
18  /* Free the action slots */
19  rt = _somvpFreeSlot(observableObj1, envObj, "slot1");
20  rt = _somvpFreeSlot(observableObj1, envObj, "slot2");
21  /* rt = _somvpFreeSlot(observableObj2, envObj, "slot3"); */
22
23  /* trigger the action slots */
24  _somvpTriggerSlot(observableObj1, envObj, observableObj2, "slot1",
25                             NULL, NULL);
26  _somvpTriggerSlot(observableObj1, envObj, observableObj2, "slot2",
27                             NULL, NULL);
28  _somvpTriggerSlot(observableObj2, envObj, observableObj2, "slot3",
29                             NULL, NULL);
30  _somFree(observableObj1);
```

- 63 -

```
1    _somFree(observableObj2);
2    _somFree(observableObj3);
3    _somFree(observableObj4);
4    _somFree(observableObj5);
5
6    exit(0);
7  }
8
```

```
1  TESTOBS2.C
2  #include  <method.h>
3  #include  <vpdebinc.h>
4  #include  <somvpinc.h>
5  #include  <dataobj.h>
6  #include  <format1.h>
7  #include  <format2.h>
8
9  /* Test the method action object :                          */
10 /* Demonstrates the usage of the method action object with the */
11 /* observable objects.                                       */
12
13 main(){
14    SOMVPActions *action1 = SOMVPMethodNew();
15    SOMVPActions *action2 = SOMVPMethodNew();
16    SOMObject *target;
17    char *info;
18    double result;
19    char *methodName1 = "displayInUpperCase";
20    char *methodName2 = "displayInLowerCase";
21    char buffer[256];
22    int rt;
23    Environment *ev = somGetGlobalEnvironment();
24    DataObject *dataobj = DataObjectNew();  /*DataObject is an observable
25    object */
26    Format1 *format1 = Format1New();
27    Format2 *format2 = Format2New();
28
29    /* init data objects */
30    __set_data(dataobj, ev, "TestString");
```

- 65 -

```
1    __set_somvpObjectKey(format1,  ev, "format1");
2    __set_somvpObjectKey(format2,  ev, "format2");
3
4    /* init method action object, action1 */
5    __set_somvpTarget(action1,  ev, format1);
6    __set_somvpObjectKey(action1,  ev, methodName1);
7
8    target = __get_somvpTarget(action1,  ev);
9    info = __get_somvpObjectKey(action1,  ev);
10   printf("get values %08x %s\n", target, info);
11
12   /* init method action object, action2 */
13   __set_somvpTarget(action2,  ev, format2);
14   __set_somvpObjectKey(action2,  ev, methodName2);
15
16   target = __get_somvpTarget(action2,  ev);
17   info = __get_somvpObjectKey(action2,  ev);
18   printf("get values %08x %s\n", target, info);
19
20   /* add action objects action1 and action2 into data object, dataobj */
21
22   _somvpAddActionObject(dataobj,  ev, "DataChanged", action1);
23   _somvpAddActionObject(dataobj,  ev, "DataChanged", action2);
24
25   /* set the data object --> will trigger "DataChanged" slot */
26   somPrintf("\n\nTest  One :\n");
27   __set_data(dataobj,  ev, "MyTestString1");
28
29   somPrintf("\n\nTest  Two :\n");
30   __set_data(dataobj,  ev, "AnotherTestString2");
```

- 66 -

```
1    exit(0);
2  }
3
```

DOCKET AT9-92-150

What is claimed is:

1. A method for efficiently controlling the execution of object oriented programs, and method comprising the steps of:
   providing at least one observable object which responds to a predetermined plurality of abstract events, each of said predetermined plurality of abstract events corresponding to an action slot container object associated with said at least one observable object;
   defining a plurality of subclasses of action objects;
   placing at least two action objects within said action slot container object, each of said at least two action objects specifying a unit of behavior implemented in defined manner for each action object within a defined subclass; and
   executing each action object within said action slot container object in response to an occurrence of a corresponding abstract event wherein an occurrence of a single abstract event corresponding to said action container object will result in an occurrence of two units of behavior.

2. The method for efficiently controlling the execution of object oriented programs according to claim 1, further including the steps of:
   specifying at execution a new abstract event;
   creating a new action slot container object corresponding to said new abstract event;
   associating said new action slot container object with said at least one observable object such that said observable object will thereafter respond to an occurrence of said new abstract event;
   placing at least one action object within said new action slot container object; and
   executing each action object within said new action slot container object in response to an occurrence of said new abstract event.

3. The method for efficiently controlling the execution for object oriented programs according to claim 1, wherein said step of defining a plurality of subclasses of said action objects further comprises the step of defining at least a method action object subclass of said action objects which invokes a specified programming interface on a target object in response to an execution thereof as a result of an occurrence of said single abstract event.

4. The method for efficiently controlling the execution for object oriented programs according to claim 1, wherein said step of defining a plurality of subclasses of said action objects further comprises the step of defining at least a script action object subclass of said action objects which interprets a specified extension language script in response to an execution thereof as a result of an occurrence of said single abstract event.

5. The method for efficiently controlling the execution of object oriented programs according to claim 1, wherein said step of defining a plurality of subclasses of said action objects further comprises the step of defining at least a procedure action object subclass of said action objects which activates a specified external procedure in response to an execution thereof as a result of an occurrence of said single abstract event.

6. The method for efficiently controlling the execution for object oriented programs according to claim 1, wherein said step of defining a plurality of subclasses of said action objects further comprises the step of defining at least an action slot action object subclass of said action objects which generates a specified abstract event corresponding to a selected action slot container object in response to an execution thereof as a result of an occurrence of said single abstract event.

7. A system for efficiently controlling the execution of object oriented programs, said system comprising:
   providing at least one observable object which responds to providing at least one observable object which responds to a predetermined plurality of abstract events, each of said predetermined plurality of abstract events corresponding to an action slot container object associated with said at least one observable object;
   means for defining a plurality of subclasses;
   means for placing at least two action objects within said action slot container object, each of said at least two action objects specifying a unit of behavior implemented in defined manner for each action object within a defined subclass; and
   means for executing each action object within said action slot container object in response to an occurrence of a corresponding abstract event wherein an occurrence of a single abstract event corresponding to said action container object will result in an occurrence of two units of behavior.

8. The system for efficiently controlling the execution of object oriented programs according to claim 7, further comprising:
   means for specifying at execution a new abstract event;
   means for creating a new action slot container object corresponding to said new abstract event;
   means for associating said new action slot container object with said at least one observable object such that said observable object will thereafter respond to an occurrence of said new abstract event;
   means for placing at least one action object within said new action slot container object; and
   means for executing each action object within said new action slot container object in response to an occurrence of said new abstract event.

9. The system for efficiently controlling the execution for object oriented programs according to claim 7, wherein said means for defining a plurality of subclasses further comprises means for defining at least a method action object subclass of said action objects which invokes a specified programing interface on a target object in response to an execution thereof as a result of an occurrence of said single abstract event.

10. The system for efficiently controlling the execution for object oriented programs according to claim 7, wherein said means for defining a plurality of subclasses of said action objects further comprises means for defining at least a script action object subclass of said action objects which interprets a specified extension language script in response to an execution thereof as a result of an occurrence of said single abstract event.

11. The system for efficiently controlling the execution of object oriented programs according to claim 7, wherein said means for defining a plurality of subclasses of said action objects further comprises means for defining at least a procedure action object subclass of said action objects which activates a specified external procedure in response to an execution thereof as a result of an occurrence of said single abstract event.

12. The system for efficiently controlling the execution for object oriented programs according to claim 7, wherein said means for defining a plurality of subclasses of said action objects further comprises means for defining at least an action slot action object subclass of said action objects which generates a specified abstract event corresponding to a selected action slot container object in response to an execution thereof as a result of an occurrence of said single abstract event.

* * * * *

UNITED STATES PATENT AND TRADEMARK OFFICE
CERTIFICATE OF CORRECTION

PATENT NO. : 6,216,149 B1
DATED : April 10, 2001
INVENTOR(S) : Conner et al.

It is certified that error appears in the above-identified patent and that said Letters Patent is hereby corrected as shown below:

Column 1,
Line 10, please correct Ser. No. "05/175,999" to read -- 08/175,999 --.

Column 2,
Line 15, please correct the word "off" to -- of --.

Signed and Sealed this

Twenty-sixth Day of March, 2002

*Attest:*

*Attesting Officer*

JAMES E. ROGAN
*Director of the United States Patent and Trademark Office*